United States Patent [19]

Suzuki et al.

[11] Patent Number: 5,552,681

[45] Date of Patent: Sep. 3, 1996

[54] APPARATUS FOR STORING ENERGY GENERATED DURING BREAKING OF A VEHICLE AND FOR PROVIDING ENERGY TO THE INTERNAL COMBUSTION ENGINE OF THE VEHICLE AT OTHER TIMES

[75] Inventors: Takayuki Suzuki, Tokorozawa; Atsuomi Obata, Hachiouji, both of Japan

[73] Assignee: Hino Jidosha Kogyo Kabushiki Kaisha, Tokyo, Japan

[21] Appl. No.: 443,756

[22] Filed: May 18, 1995

Related U.S. Application Data

[62] Division of Ser. No. 137,196, Oct. 22, 1993, Pat. No. 5,513,718.

[30] Foreign Application Priority Data

| Mar. 6, 1992 | [JP] | Japan | 4-49870 |
| Mar. 6, 1992 | [JP] | Japan | 4-49911 |
| Mar. 6, 1992 | [JP] | Japan | 4-49932 |

[51] Int. Cl.⁶ .................................. H02B 3/00
[52] U.S. Cl. .................. 318/139; 318/376; 318/801; 307/66
[58] Field of Search ........................ 318/798–815, 318/139, 375, 254,376, 140, 148, 152, 798–815; 307/52, 54, 58, 63–68; 290/8, 14, 16, 20, 31, 34, 45, 50, 51; 363/34, 129, 131, 132, 150; 180/65.2, 65.4

[56] References Cited

U.S. PATENT DOCUMENTS

| 2,763,826 | 9/1956 | Friedman . | |
| 3,041,501 | 6/1962 | Willits . | |
| 3,231,701 | 1/1966 | Craig . | |
| 3,526,821 | 9/1970 | Thomas . | |
| 3,753,001 | 8/1973 | Hiroshima et al. . | |
| 3,805,143 | 4/1974 | Tauern et al. . | |
| 4,127,782 | 11/1978 | Omura et al. | 307/66 X |
| 4,916,329 | 4/1990 | Dang et al. | 307/66 |
| 5,010,469 | 4/1991 | Bobry | 363/132 |
| 5,053,632 | 10/1991 | Suzuki et al. . | |
| 5,241,217 | 8/1993 | Severinsky | 307/64 |
| 5,285,862 | 2/1994 | Furutani et al. | 307/65.4 |
| 5,289,045 | 2/1994 | Lavin et al. | 307/64 |
| 5,373,196 | 12/1994 | Faley | 307/64 |
| 5,412,293 | 5/1995 | Minezawa et al. | 318/376 |

FOREIGN PATENT DOCUMENTS

| 63-206103 | 8/1988 | Japan . |
| 63-206101 | 8/1988 | Japan . |
| 63-314101 | 12/1988 | Japan . |
| WO88/06107 | 2/1988 | WIPO . |

*Primary Examiner*—Jonathan Wysocki
*Attorney, Agent, or Firm*—Cushman, Darby & Cushman

[57] ABSTRACT

A braking and auxiliary driving unit for an internal combustion engine which produces braking and auxiliary motive power by converting electrical energy in both directions between a polyphase AC circuit of a squirrel-cage polyphase induction machine linked to the rotary shaft of the internal combustion engine and the DC circuit of an electricity storage means, the electricity storage means comprises an electrostatic capacitive circuit. A low-voltage storage battery is provided in addition to this electrostatic capacitive circuit, and this can be coupled to the electrostatic capacitive circuit by a bidirectional DC-to-DC converter.

11 Claims, 12 Drawing Sheets

APPARATUS FOR STORING ENERGY GENERATED DURING BREAKING OF A VEHICLE AND FOR PROVIDING ENERGY TO THE INTERNAL COMBUSTION ENGINE OF THE VEHICLE AT OTHER TIMES

This is a division of application Ser. No. 08/137,196, filed Oct. 22, 1993 U.S. Pat. No. 5,513,718.

BACKGROUND OF THE INVENTION

1. Field of the Invention

This invention is utilized in devices which convert mechanical energy produced during braking of an internal combustion engine into electrical energy, store this electrical energy, and supply stored electrical energy to an auxiliary acceleration device when the internal combustion engine is to be accelerated, thereby generating mechanical energy. In particular, this invention is utilized in devices in which a rotary squirrel-cage polyphase induction machine is coupled to a rotary shaft of an internal combustion engine, and in which this squirrel-cage polyphase induction machine acts as an electric generator during braking and as an electric motor during acceleration. This invention is a device which is suited to being carried by a motor vehicle equipped with an auxiliary acceleration and auxiliary braking device.

2. Description of the Related Art

The present applicant has disclosed an electric braking and auxiliary acceleration means for motor vehicles in PCT Publication No. WO88/O6107 (PCT Application No. PCT/JP88/00157). As shown in FIG. 12, this device is equipped with a squirrel-cage polyphase induction machine 2, the rotor of which is directly connected to internal combustion engine 1; storage battery circuit 3 for storing electricity; inverter circuit 4 which converts the DC voltage of this storage battery circuit 3 to an AC voltage of a frequency suitable for inducing a rotating magnetic field with a lower rotational speed than the axial rotational speed of squirrel-cage polyphase induction machine 2, and which gives this AC voltage to squirrel-cage polyphase induction machine 2, and which converts AC power from squirrel-cage polyphase induction machine 2 to DC power; and inverter control circuit 5 which generates control signals which set the frequency of the AC-side voltage of this inverter circuit 4. This inverter control circuit 5 includes means for generating control commands from the driver to suit the operation of the motor vehicle.

Squirrel-cage polyphase induction machine 2 is also fitted with rotation sensor 6, and signals from this rotation sensor 6 are given to inverter control circuit 5, to which information from storage battery circuit 3 relating to the charge condition of the storage battery is also input.

Capacitor 7 and semiconductor switching circuit 12 are connected to the output of inverter circuit 4. Resistor 11 is also connected to the output of inverter circuit 4, via this semiconductor switching circuit 12. Resistor 11 is constituted in a manner such that it dissipates any excess electrical energy which is generated by heavy braking of the vehicle and which cannot be regenerated.

Detection circuit 13 for detecting the output voltage of inverter circuit 4 is also connected to storage battery circuit 3 and semiconductor switching circuit 12, and current detector 15 is provided at resistor 11 for detecting changes in current. Switching control circuit 14 is connected to current detector 15, and controls semiconductor switching circuit 12 in accordance with its detection signals. Detection circuit 13 is connected to this switching control circuit 14.

When a motor vehicle equipped with this device brakes, energy generated by braking is recovered and stored as electrical energy, and when such a vehicle accelerates, this stored electrical energy is converted to mechanical energy, thereby supplying auxiliary motive power to the internal combustion engine which drives the axle.

That is to say, the control circuit which controls the inverter does so in such a manner that in an acceleration mode, in which the squirrel-cage polyphase induction machine is used as an auxiliary driving means for the internal combustion engine, the inverter circuit provides the squirrel-cage polyphase induction machine with a rotating magnetic field which has a rotational speed that exceeds the rotational speed of the internal combustion engine; while in deceleration mode, in which the squirrel-cage polyphase induction machine is used as a braking device for the internal combustion engine, the inverter circuit provides the squirrel-cage polyphase induction machine with a rotating magnetic field which has a rotational speed which is less than the rotational speed of the internal combustion engine. In the acceleration mode, the inverter circuit gives the DC output resulting from the electrical energy that has been stored in the electricity storage means to the squirrel-cage polyphase induction machine as a polyphase AC output; while in deceleration mode, it gives the polyphase AC output energy of the squirrel-cage polyphase induction machine to the electricity storage means as a DC output.

In this previous device, the aforementioned electricity storage means is a storage battery. That is to say, the rated voltage at the DC side of the inverter is 200~300 V, and a storage battery with this rated voltage is obtained by connecting a large number of motor vehicle lead storage batteries in series.

The applicant has successfully designed and manufactured practical versions of the aforementioned device and has introduced them on a trial basis, mainly in buses making regular runs in urban areas. It has therefore been possible to carry out numerous tests.

The results of these tests have indicated that the device described above is an extremely useful device which does not simply dissipate the energy generated during braking but is able to recover and utilize it effectively. The results have also shown that this device gives an essentially excellent performance which enables it to be implemented not just in large motor vehicles, but also more widely in passenger cars and small goods vehicles as well. However, it was found that the following problems arise when a large lead storage battery is carried on a practical vehicle:

A considerable volume is taken up . . . more specifically, because ten or more series-connected 24 V lead storage batteries are used, the total volume is 0.2~0.4 $m^2$.

Vehicle body weight increases . . . more specifically, there is an increase of 200~300 kg.

There must be a mounting structure that will provide adequate safety for human beings, given that DC electric power of several tens of amperes at voltages in excess of 200 V will be utilized . . . more specifically, it is necessary to have a safe arrangement of the sort where dangerous electrical parts are mounted in a secure box provided with a door that can be opened and shut, and where the circuits are automatically isolated when the door is opened.

Because lead storage batteries are devices that involve chemical reactions, various maintenance procedures are required. For example, the amount of electrolyte has to be observed under fixed conditions and its specific gravity measured, the electrolyte has to be replenished, and supplementary charging carried out . . . the man-hours involved in such maintenance become considerable, and its application to private automobiles is difficult.

To give convenient maintenance, all the batteries have to be arranged in one place . . . sufficient space for this cannot be found in a small vehicle.

There are energy losses due to the internal resistance of the cells . . . this impairs the efficiency with which energy recovered during braking is utilized during acceleration.

Under ordinary operating conditions, the present storage capacity of the batteries cannot be detected electrically accurately enough for use in automatic control . . . although the present storage capacity can be found fairly accurately by measuring the specific gravity of the electrolyte, sufficient accuracy cannot be guaranteed in measurements with simple ammeters or voltmeters, due to the aforementioned internal resistance changing with change in temperature, so electrical ,measurements cannot be utilized as real-time control information.

The present invention is proposed as a means of solving the aforementioned problems. In other words, the object of this invention is to provide a device which solves the various problems described above and which enables the above described principle of good energy utilization efficiency to be widely implemented, even in smaller motor vehicles.

SUMMARY OF THE INVENTION

A distinguishing characteristic of this invention is that it utilizes an electrostatic capacitive circuit as the electricity storage means. More specifically, the electrostatic capacitive circuit can be constituted by connecting electrically in parallel a plurality of series circuits each of which comprises a plurality of unit capacitors connected electrically in series. Because it can be implemented by series and parallel connections of a plurality of unit capacitors, the electrostatic capacitive circuit has a plurality of units that are distributed in dispersed fashion around various parts of a motor vehicle.

A commercial electric double layer capacitor may be utilized as the specific implementation of the unit capacitor. Such electric double layer capacitors are widely used for backup of electronic circuits, and capacitors with a breakdown voltage of 2 V and an electrostatic capacitance of 500 F (farads) are available. Connecting 150 of these in series gives a breakdown voltage of 300 V, and by further connecting six of these series circuits in parallel, an assembly with an electrostatic capacitance of 20 F can be obtained.

This invention can also be constituted in a manner such that a storage battery with a lower terminal voltage than the DC terminal voltage of the aforementioned inverter circuit is connected to the electrostatic capacitive circuit via a step-up/step-down converter, and the step-up/step-down converter is controlled by the aforementioned control circuits.

Given this arrangement, this invention can be constituted in such manner that the inverter control circuit includes the following control modes:

an initial charging mode wherein, with the internal combustion engine at a standstill, the aforementioned electrostatic capacitive circuit is charged with the energy of the aforementioned storage battery after the voltage has been stepped up by the step-up/step-down converter;

a starting mode wherein, when the internal combustion engine is being started, energy stored in the electrostatic capacitive circuit is given to the aforementioned squirrel-cage polyphase induction machine as an AC current via the aforementioned inverter circuit, and the squirrel-cage polyphase induction machine is made to operate as an electric motor;

a deceleration mode wherein, when the vehicle is being braked, the squirrel-cage polyphase induction machine is made to operate as an electric generator, and the output AC current of the squirrel-cage polyphase induction machine is supplied to the aforementioned electrostatic capacitive circuit as a charging current via the aforementioned inverter circuit; and an acceleration mode wherein, when the vehicle is being accelerated, the squirrel-cage polyphase induction machine is made to operate as an electric motor, and energy stored in the electrostatic capacitive circuit is supplied via the inverter circuit to the squirrel-cage polyphase induction machine as an AC current.

The present invention can also be constituted in a manner such that, in addition to the aforementioned control modes, the control modes include:

a warm-up mode wherein, when the internal combustion engine is warming up, the squirrel-cage polyphase induction machine is made to operate as an electric generator, and the output AC current of said squirrel-cage polyphase induction machine is supplied via the inverter circuit to the electrostatic capacitive circuit as a charging current; and a supplementary charging mode wherein, when the internal combustion engine is operating and the terminal voltage of the aforementioned electrostatic capacitive circuit has fallen to or below a prescribed value, the squirrel-cage polyphase induction machine is made to operate as an electric generator, and the output AC current of said squirrel-cage polyphase induction machine is supplied via the inverter circuit to the electrostatic capacitive circuit as a charging current.

It is desirable for the aforementioned low terminal voltage storage battery to be rated for the standard electrical equipment of the motor vehicle.

This invention can also be constituted in a manner such that a storage battery with a lower terminal voltage than the DC terminal voltage of the inverter circuit is connected to the electrostatic capacitive circuit via a bidirectional DC-to-DC converter, and this bidirectional DC-to-DC converter includes a converter control circuit which controls the direction of energy transfer by controlling the switching of the switching elements in the DC-to-DC converter.

This invention may be constituted in a manner such that the low-voltage side common potential, which constitutes one terminal of the aforementioned storage battery, is isolated from the high-voltage side common potential, which constitutes one terminal of the aforementioned electrostatic capacitive circuit, and the common potential of the inverter control circuit is connected to the aforementioned high-voltage side common potential, and common potential separation circuits containing photocouplers are provided at the control input points of the inverter control circuit.

The aforementioned low-voltage side common potential may be connected to the potential of the internal combustion engine or the motor vehicle.

The aforementioned converter control circuit may include as its control modes:

an initial charging mode, wherein the electrostatic capacitive circuit is charged with the energy of the storage battery after conversion by the aforementioned DC-to-DC converter; and a battery charging mode, wherein, when the terminal voltage of the electrostatic capacitive circuit exceeds a prescribed value, the storage battery is charged with the stored electrical energy of this electrostatic capacitive circuit after conversion by the DC-to-DC converter.

It is desirable for the invention to have a construction wherein the aforementioned inverter circuit, inverter control circuit and electrostatic capacitive circuit are encased in an electrically insulating material and housed in a metal container connected to the vehicle body potential.

A specific implementation will now be examined. If the breakdown voltage of 300 V is utilized at a rated voltage of 200 V, the rated quantity of charge that it is charged with is:

200 V×20 F=4000 coulombs (= ampere seconds)

Using an inverter that is currently being tested:

4000 coulombs/160 amperes=25 seconds which shows that a 25-second assist is possible given an electric power corresponding to a maximum current of 160 A at a maximum voltage of 200 V. Since the device is not operated continuously at maximum rating, this means that a device can be obtained which will work effectively under ordinary operating conditions to give continuous deceleration or acceleration of several tens of seconds.

Regarding this exemplification, if 150 unit capacitors each with a breakdown voltage of 2 V and an electrostatic capacitance of 500 F are connected in series to give a breakdown voltage of 300 V, and six such series circuits are further connected in parallel to give an array with an electrostatic capacitance of 20 F, then, since there are approximately 900 unit capacitors, if these are centralized in one place, the actual size will come to approximately the size of a Japanese-style tatami mat (approximately 6ft×3 ft). The weight will be a fraction of that of a lead storage battery. Because no maintenance is required when an electrostatic capacitive circuit is used, if the overall size is going to be of this order, the array can be constructed in such manner that it is distributed in dispersed fashion around various parts of the vehicle and joined with electrical wires. Furthermore, because no maintenance is required, human safety can be ensured by sealing the electrostatic capacitive circuit itself inside a secure insulating structure. Also, because there is substantially no internal resistance in an electrostatic capacitive circuit, there is no loss of stored electrical energy, so that effective energy utilization is achieved. Moreover, because the quantity of stored charge in an electrostatic capacitive circuit is proportional to the terminal voltage during release, the quantity of stored charge can be found accurately and in real-time by voltage detection, and this can be utilized directly for control purposes.

In tests with this sort of device, the electric charge in the electrostatic capacitive circuit will eventually self-discharge if the device is not used for a long time. There is a similar situation when this device is first used after manufacture, since no charge has been stored in the electrostatic capacitive circuit. Now, it is impossible to start the internal combustion engine when there is hardly any charge stored in the electrostatic capacitive circuit.

To remedy this, to provide an electrostatic capacitive circuit directly connected to the DC side of the inverter circuit is provided as the storage means, plus a storage battery with a lower voltage than this DC-side voltage likewise is connected to this DC side via a step-up/step-down converter.

If a vehicle which has this device is equipped with a storage battery (terminal voltage 24 V or 12 V), the energy of this storage battery can be utilized when there is hardly any stored charge in the electrostatic capacitive circuit, i.e., either directly after manufacture of the device or when it has not been used for a Considerable length of time.

In the initial charging mode, the step-up/step-down converter is used to generate high voltage pulses from the terminal voltage of this storage battery, thereby causing some charge to be stored in the electrostatic capacitive circuit.

In starting mode, the internal combustion engine is started by utilizing electric charge that has been stored in this initial charging mode to make the squirrel-cage polyphase induction machine operate as an electric motor.

When the internal combustion engine is revolving under its own power, electric power is extracted from the squirrel-cage polyphase induction machine and electric charge once again is stored in the electrostatic capacitive circuit. It is desirable for this to be a special form of control for a warm-up mode. The electrostatic capacitive circuit reaches its rated terminal voltage in this warm-up mode.

The motor vehicle is now able to go. In acceleration mode, electric charge that has been stored in the electrostatic capacitive circuit is discharged and the squirrel-cage polyphase induction machine used for auxiliary motive power. In deceleration mode, electrical energy generated by the squirrel-cage induction machine is stored in the electrostatic capacitive circuit.

If the acceleration mode is used too much so that and the quantity of charge stored in the electrostatic capacitive circuit is less than a prescribed value, the control mode is changed to supplementary charging mode and the squirrel-cage polyphase induction machine is made to operate as an electric generator. Accordingly, provided that the internal combustion engine is rotating, the quantity of electric charge stored in the electrostatic capacitive circuit can always be maintained at or above a prescribed value.

With this device, when there is plentiful stored electric charge in the electrostatic capacitive circuit, the low terminal voltage storage battery can be maintained in a charged condition by controlling the step-up/step-down converter so as to generate a low voltage. Charging of the storage battery need not be by this method, and it is also feasible for it to be charged by means of an alternator of the sort conventionally fitted to internal combustion engines.

Given a constitution wherein an alternator is utilized in this manner, the aforementioned step-up/step-down converter :can be a simple step-up converter. In such a case, the step-up converter can be a DC-to-DC converter, which is well known as a power supply device.

An explanation will now be given of the case where a bidirectional DC-to-DC converter is utilized. In the initial charging mode, the bidirectional DC-to-DC converter is used to generate a high voltage from the terminal voltage of the storage battery, thereby causing some charge to be stored in the electrostatic capacitive circuit. In starting mode, the internal combustion engine is started by utilizing electric charge that has been stored during this initial charging mode to make the squirrel-cage polyphase induction machine operate as an electric motor. When the internal combustion engine is revolving under its own power, electric power is extracted from the squirrel-cage polyphase induction machine and electric charge once again storm in the electrostatic capacitive circuit. It is desirable for this to be a special form of control for a warm-up mode. The electrostatic capacitive circuit reaches its rated terminal voltage in this warm-up mode.

The motor vehicle is now able to go. In acceleration mode, electric charge that has been stored in the electrostatic capacitive circuit is discharged and the squirrel-cage polyphase induction machine used for auxiliary motive power. In deceleration mode, electrical energy generated by the squirrel-cage induction machine is stored in the electrostatic capacitive circuit.

If has been used too much, the acceleration mode and the quantity of charge stored in the electrostatic capacitive circuit is less than a prescribed value, the control mode is changed to supplementary charging mode and the squirrel-cage polyphase induction machine made to operate as an electric generator. Accordingly, provided that the internal combustion engine is rotating, the quantity of electric charge stored in the electrostatic capacitive circuit can always be maintained at or above a prescribed value.

With this device, when there is plentiful storm electric charge in the electrostatic capacitive circuit, the inverter control circuit can steadily maintain the storage battery in a charged condition by controlling the bidirectional DC-to-DC converter so as to generate a low voltage.

With a device according to this invention, the common potential can be separated into a high-voltage side and a low-voltage side. The low-voltage side is then common with the general load circuit of the motor vehicle and the common potential is connected to the vehicle body potential. In other words, a device according to this invention enables the low-voltage side and high-voltage side common potentials to be separated by means of the transformer in the bidirectional DC-to-DC converter. On the high-voltage side, the common potential is not connected to the vehicle body and is therefore floating with respect to vehicle body potential. Accordingly, if for any reason a human body were to come into contact with a high-voltage circuit, no electric shock would immediately be received, and danger could be avoided.

In the case of the various control inputs to the inverter control circuit (e.g., sensor inputs and driver-manipulated inputs), the common potentials are separated by common potential separation circuits and the signals are transmitted by means of photocouplers. The common potential of the inverter control circuit can therefore be connected to the common potential of the inverter.

DETAILED DESCRIPTION OF THE PRESENTLY PREFERRED EMBODIMENTS

Figure 1:
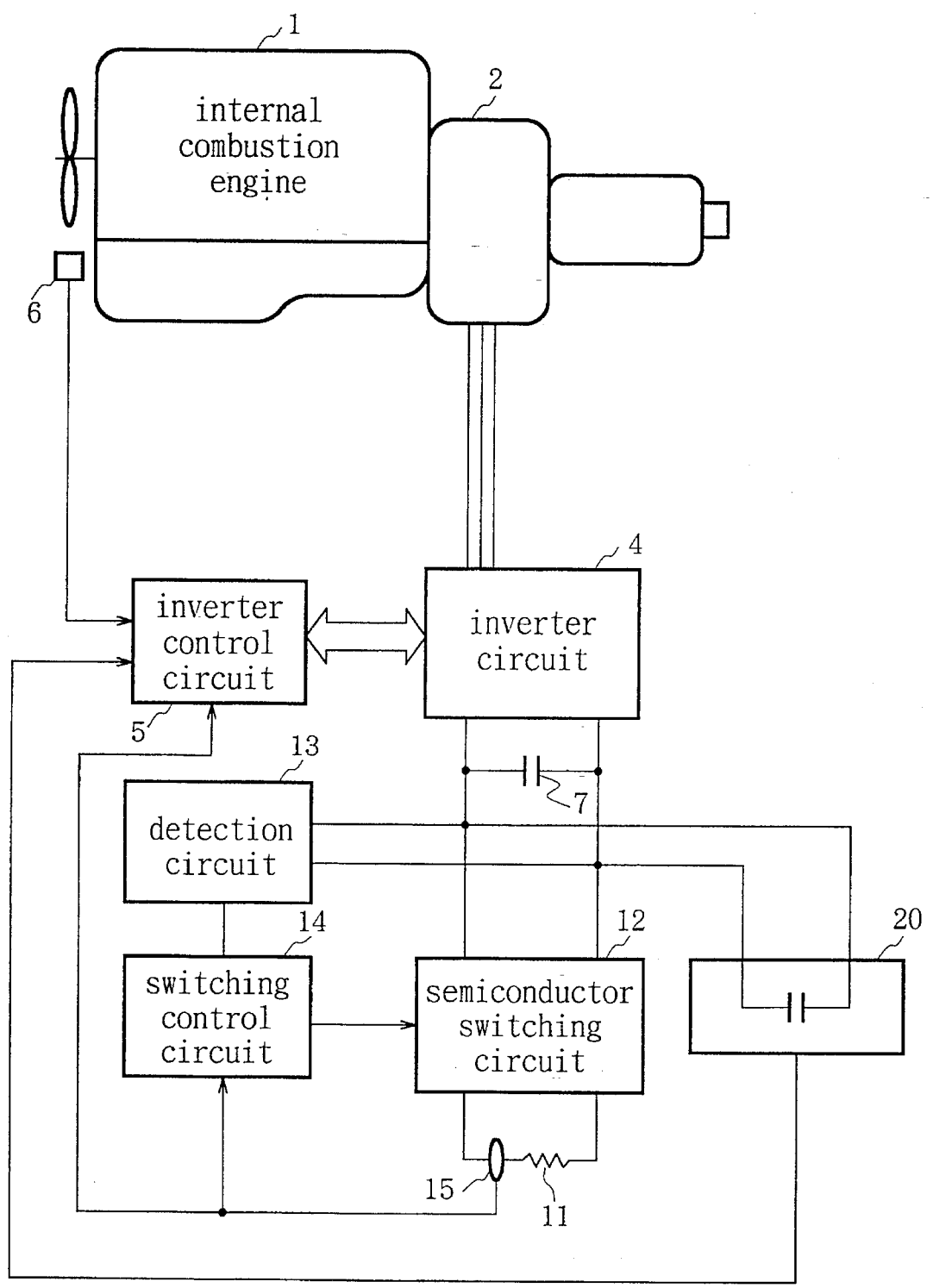
FIG. 1 is a block diagram showing the constitution of a first embodiment of this invention.

The following is a listing of the components of the present invention illustrated in the figures and the reference numerals associated therewith 1 ... internal combustion engine; 2 ... squirrel-cage polyphase induction machine; 3 ... storage battery circuit; 4 ... inverter circuit; 5 ... inverter control circuit; 6 ... rotation sensor; 7 ... capacitor; 11 ... resistor; 12 ... semiconductor switching circuit; 13 ... detection circuit; 14 ... switching control circuit; 15 ... current detector; 19 ... bidirectional DC-to-DC converter; 20 ... electrostatic capacitive circuit; 21 ... step-up/step-down converter; 22 ... storage battery; 24 ... converter control circuit; 25 ... common potential separation circuit for control input; 25a, 26a ... photocouplers; 26 ... common potential separation circuit for output; 25b, 26b ... filters; 26c ... relay; 26d ... switch; 26e ... diode; 26f ... resistor; 30 metal container; 31a, 31b ... low-voltage side terminals; 31c, 31d ... high-voltage side terminals; 32 ... low-voltage windings; 33 ... high-voltage windings; 35 ... transformer; Da, Db ... low-voltage side rectifying elements; Dc, Dd ... high-voltage side rectifying elements; Ta, Tb ... low-voltage side switching elements; Tc, Td ... high-voltage side switching elements; V1 ... low-voltage side voltage detection circuit; V2 ... high-voltage side voltage detection circuit; I1 ... low-voltage side current detection circuit; I2 ... high-voltage side current detection circuit.

EMBODIMENTS

Embodiments of this invention will now be explained on the basis of the drawings. FIG. 1 is a block diagram showing the constitution of a first embodiment of this invention.

A device according to the first embodiment has an electrostatic capacitive circuit as the electricity storage means. In addition, just as in the case of the prior art, a device according to the first embodiment has squirrel-cage polyphase induction machine 2, the rotor of which is directly connected to internal combustion engine 1; inverter circuit 4 which converts the DC voltage of electrostatic capacitive circuit 20 to an AC voltage of a frequency suitable for inducing a rotating magnetic field with a rotational speed which is lower than or higher than the axial rotational speed of squirrel-cage polyphase induction machine 2, and which gives this AC voltage to squirrel-cage polyphase induction machine 2, or which converts the AC power from squirrel-cage polyphase induction machine 2 to DC power; and inverter control circuit 5 which generates control signals that set the frequency of the AC-side voltage of this inverter circuit 4. This inverter control circuit 5 includes means for generating control commands from the driver to suit the operation of the motor vehicle.

Squirrel-cage polyphase induction machine 2 is also fitted with rotation sensor 6, and signals from this rotation sensor 6 are given to inverter control circuit 5, to which information relating to the charging condition of electrostatic capacitive circuit 20 is also input.

Capacitor 7 and semiconductor switching circuit 12 are connected to the output side of inverter circuit 4. Resistor 11 is also connected to the output side of inverter circuit 4, via this semiconductor switching circuit 12. This resistor 11 dissipates any excess electrical energy which is generated by heavy braking of the vehicle and which cannot be regenerated.

Detection circuit 13 for detecting the output voltage of inverter circuit 4 is also connected to electrostatic capacitive circuit 20 and semiconductor switching circuit 12, and current detector 15 is provided at resistor 11 for detecting changes in current. Switching control circuit 14 is connected to this current detector 15 and controls semiconductor switching circuit 12 in accordance with its detection signals. Detection circuit 13 is connected to this switching control circuit 14.

Inverter control circuit 5 also includes a means for controlling inverter circuit 4 in a manner such that in acceleration mode, in which squirrel-cage polyphase induction machine 2 is used as an auxiliary driving means for internal combustion engine 1, a rotating magnetic field with a velocity which exceeds the rotational speed of internal combustion engine 1 is given to squirrel-cage polyphase induction machine 2, while in deceleration mode, in which squirrel-cage polyphase induction machine 2 is used as a braking device for internal combustion engine 1, a rotating magnetic field with a velocity that is less than the rotational speed of internal combustion engine 1 is given to squirrel-cage polyphase induction machine 2. Inverter circuit 4 includes a circuit means which, in the aforementioned acceleration mode, gives the DC output resulting from the electrical energy that has been stored in electrostatic capacitive circuit 20 to squirrel-cage polyphase induction machine 2 as a polyphase AC output; and in deceleration mode, gives the polyphase AC output energy of the squirrel-cage polyphase induction machine to electrostatic capacitive circuit 20 as a DC output.

Figure 2:
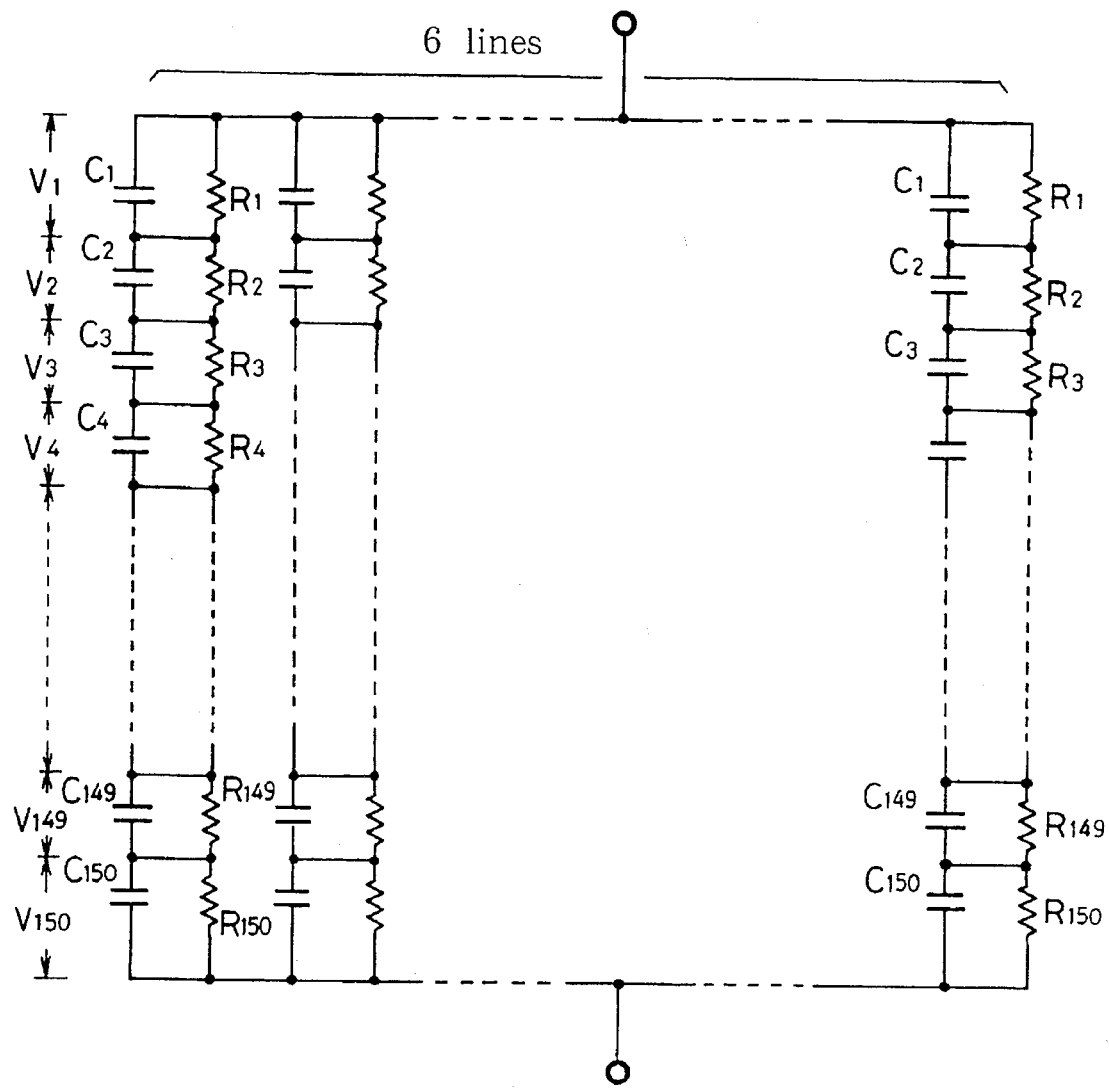
FIG. 2 shows an example of the constitution of the electrostatic capacitive circuit in the first embodiment of this invention.

As shown in FIG. 2, which depicts one exemplification, electrostatic capacitive circuit 20 is an array of 900 capacitors in total. These are arranged in series circuits, each of which comprises 150 unit capacitors $C_1$, $C_2$, ... $C_{150}$ of identical electrostatic capacitance (500 F, 2 V) connected electrically in series. Six such series circuits are then connected in parallel.

Resistances $R_1$, $R_2$, $R_3$, ... $R_{150}$ of identical resistance value are respectively connected in parallel across each of these capacitors, and each of the resulting six lines of resistances is connected in series.

Resistances are arranged in this manner for the following reason. Even though each capacitor has the same nominal electrostatic capacitance, manufacturing tolerances are such that there is some—albeit slight—variation in actual capacitance value, with the result that there will be differences in the terminal voltage generated across the capacitors. To prevent this, resistances (which exhibit little manufacturing variation) are connected in parallel across each capacitor to make the generated terminal voltages as uniform as possible. These resistances $R_1$, $R_2$, $R_3$, ... $R_{150}$ can be omitted if manufacturing variations in the capacitors have been reduced.

In this exemplification, as described above, 900 of the capacitors and resistances are used. If these are arranged in a plane, the resulting array has approximately the dimensions of one tatami mat, i.e., 900 mm×1800 mm in area and 45 mm thick. However, once the series-connected groups of capacitors and resistances have been connected electrically, they can be distributed in dispersed fashion in spaces within the vehicle that are not being utilized. Accordingly, there need be no reduction in useable space, and such an array can be made much lighter than a conventional battery.

Although 900 capacitors and resistances were used in the example described above, this is not a necessary restriction, and the number can be set freely to suit each type of vehicle.

For example, some commercial electric double layer capacitors have a breakdown voltage of 2 V and an electrostatic capacitance of 500 F. If 150 of these are connected in series, the breakdown voltage becomes 300 V, and if six such circuits are connected in parallel, an electrostatic capacitance of 20 F is obtained.

If the breakdown voltage of 300 V is utilized at a rated voltage of 200 V, the rated quantity of charge that it is charged with is:

200 V×20 F=4000 coulombs (= ampere seconds)

With the inverter that is currently being used, the maximum current is 160 A, so:

4000 coulombs/160 amperes=25 seconds which means that auxiliary motive power can be supplied for 25 seconds given an electric power corresponding to a maximum current of 160 A at a maximum voltage of 200 V.

An explanation will now be given of the operation of the embodiment of this invention so constituted.

First of all, when a braking force is to be generated in the rotary system, inverter control circuit 5 generates control signals such that a rotating magnetic field with a lower velocity than the rotational speed of the rotor of squirrel-cage polyphase induction machine 2, as detected by rotation sensor 6, is given to the stator of squirrel-cage polyphase induction machine 2. In this situation, squirrel-cage polyphase induction machine 2 operates as an electric generator and the electrical energy generated is converted to DC energy by inverter circuit 4 and supplied to electrostatic capacitive circuit 20 as a charging current. When braking torque is so large that electrostatic capacitive circuit 20 cannot completely absorb this DC energy, the DC terminal voltage increases until it exceeds a prescribed value, whereupon semiconductor switching circuit 12 detects this and closes, so that resistor 11 is connected across the terminals of electrostatic capacitive circuit 20.

On the other hand, when a driving force is to be given to the rotary system, inverter control circuit 5 generates control signals such that a rotating magnetic field with a higher velocity than the rotational speed of the rotor of squirrel-cage polyphase induction machine 2, as detected by rotation sensor 6, is given to the stator of squirrel-cage polyphase induction machine 2. In this situation, DC current is extracted from electrostatic capacitive circuit 20, converted by inverter circuit 4 to a polyphase alternating current suitable for the rotating magnetic field, and supplied to squirrel-cage polyphase induction machine 2.

Both braking torque and driving force increase with increasing difference between the rotational speed of the rotating magnetic field and the axial rotational speed. In this embodiment, the ratio between this difference and the rotational speed of the rotating magnetic field—in other words, the slip of squirrel-cage polyphase induction machine 2—is restricted to ±10%.

An explanation will now be given of how the charging of electrostatic capacitive circuit 20 is controlled. Control signals for giving a rotating magnetic field to the stator of squirrel-cage polyphase induction machine 2, wherein the rotating magnetic field corresponds to the rotation of the rotor of said induction machine, are supplied to inverter circuit 4 from inverter control circuit 5. Rotation information from rotation sensor 6 and information relating to the state of charging of electrostatic capacitive circuit 20 are input to this inverter control circuit 5. Inverter control circuit 5 contains a microprocessor and a means whereby operating control signals (which will change according to the driving situation) are introduced as a result of control action by the driver.

As well as being able to give the energy of the DC-side terminals to the AC-side terminals as described above, inverter circuit 4 can give energy generated at the AC-side terminals to the DC-side terminals. Moreover, by using inverter control circuit 5 to control the rotational speed of the rotating magnetic field so that squirrel-cage polyphase induction machine 2 becomes an electric motor, a driving force can be given to the rotary shaft of squirrel-cage polyphase induction machine 2, thereby making the induction machine operate as an auxiliary driving means for internal combustion engine 1. Electrical energy charged in electrostatic capacitive circuit 20 is used under these circumstances.

As long as the internal combustion engine is rotating, charging of electrostatic capacitive circuit 20 by the electric generator coupled to the internal combustion engine is continued. If stored energy resulting from charging is used due to operation of a starter motor or auxiliary equipment, the charging of electrostatic capacitive circuit 20 is controlled so that it reaches a fully charged state equivalent to its rated charged capacity in as short a time as possible.

Figure 3:
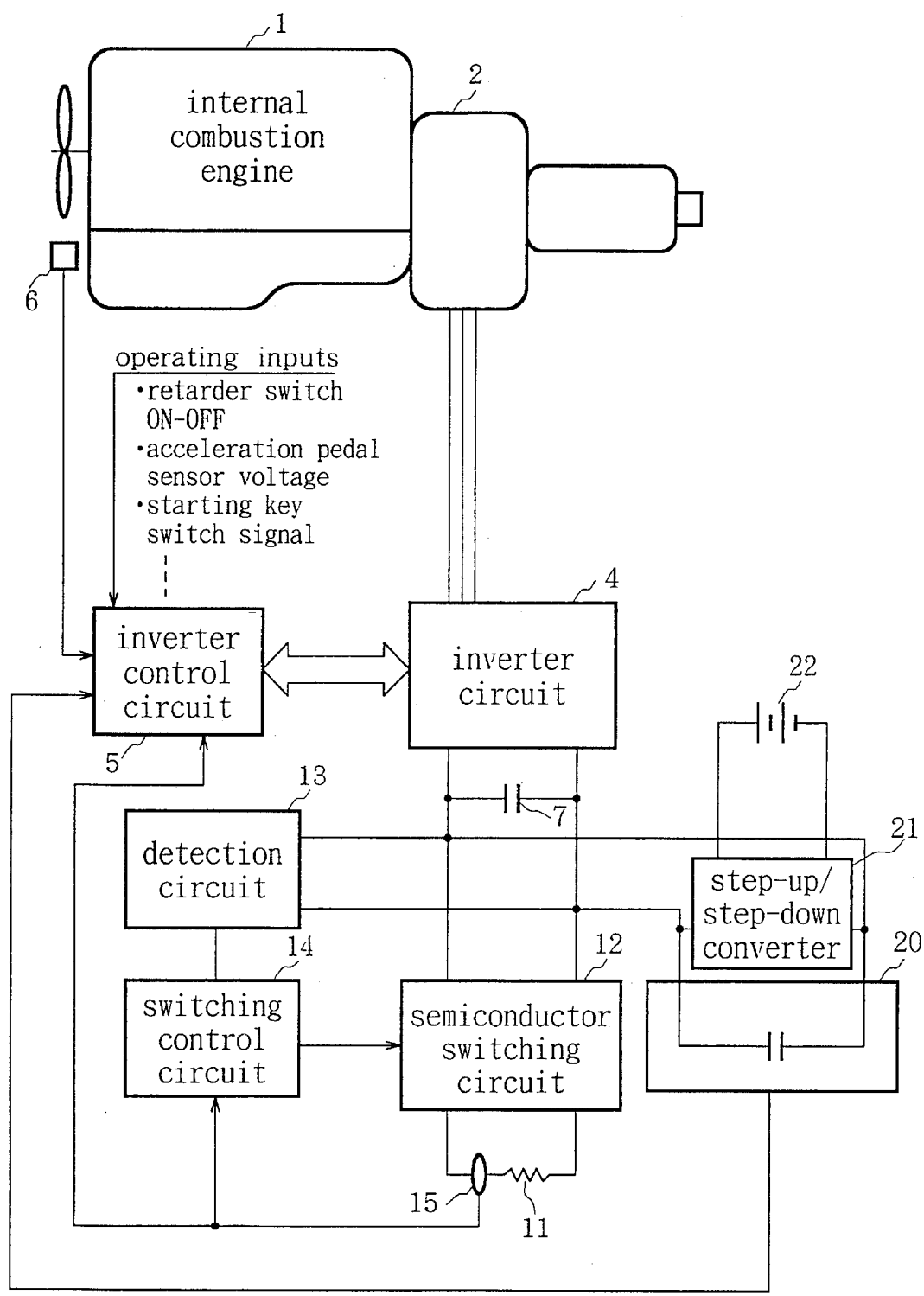
FIG. 3 is a block diagram showing the overall constitution of a second embodiment of this invention.
Figure 4:
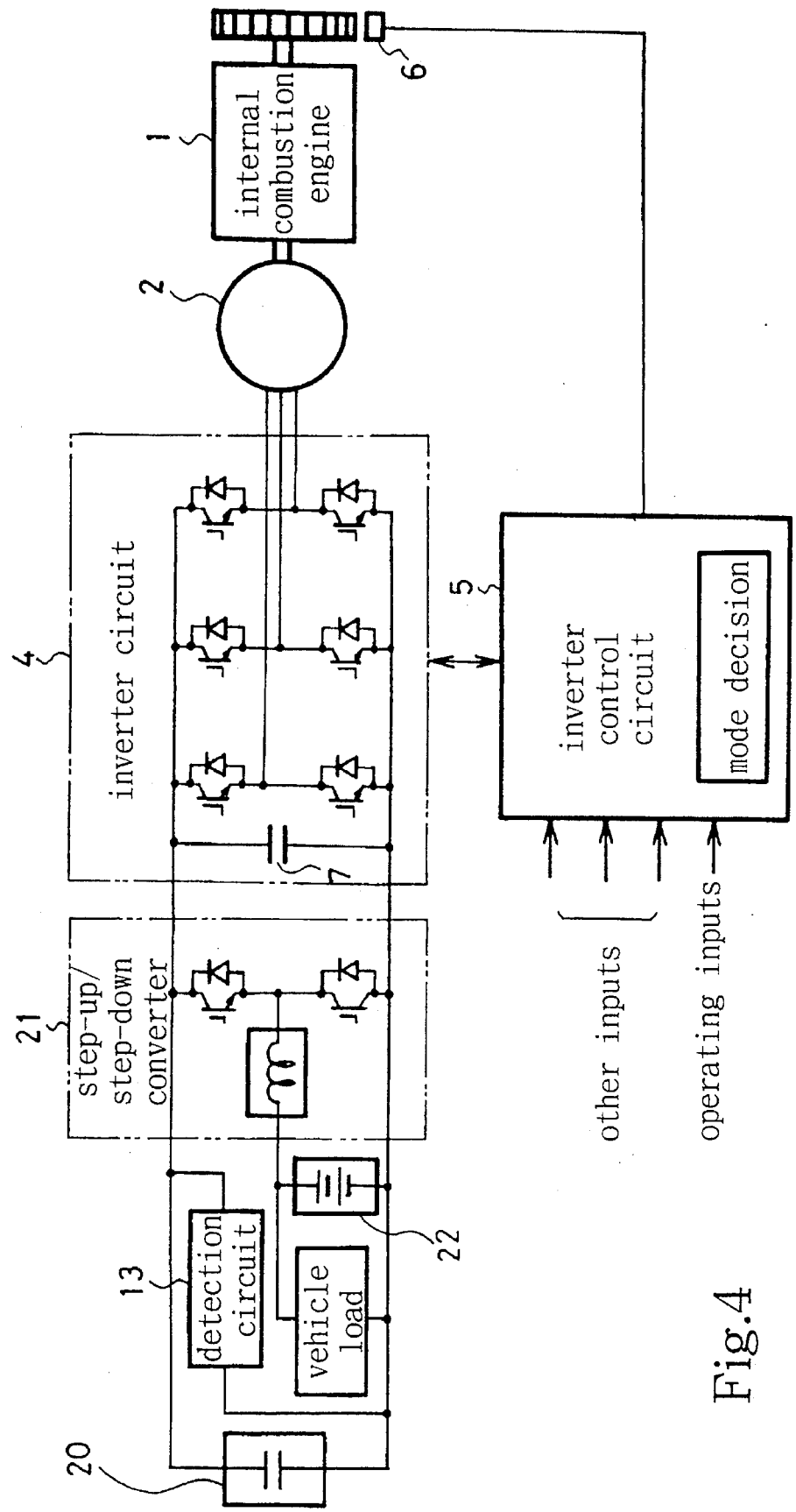
FIG. 4 is a block diagram showing the constitution of the step-up/step-down converter and the inverter circuit in the second embodiment of this invention.

FIG. 3 is a block diagram showing the overall constitution of a second embodiment of this invention, and FIG. 4 is a block diagram showing the constitution of the step-up/step-down converter and the inverter circuit in this second embodiment.

The distinguishing characteristics of the second embodiment shown in FIG. 3 are that it contains an electrostatic capacitive circuit 20, which is directly connected to the DC side of inverter circuit 4, and a storage battery 22, which is connected to this electrostatic capacitive circuit 20 via step-up/step-down converter 21 and which has a lower terminal voltage than the DC terminal voltage of inverter circuit 4, and step-up/step-down converter 21 is controlled by inverter control circuit 5.

FIG. 4 shows the constitution of this second embodiment, focusing particularly on the electrical system. Identical constituent elements have been given identical numbers and can be understood in the same way. Detailed explanations of such identical parts will therefore be omitted.

The control modes of inverter control circuit 5 include an initial charging mode wherein, with internal combustion engine 1 at standstill, electrostatic capacitive circuit 20 is charged with the energy of storage battery 22 after the voltage has been stepped up by step-up/step-down converter 21; a starting mode wherein, when internal combustion engine 1 is being started, energy stored in electrostatic capacitive circuit 20 is given to squirrel-cage polyphase induction machine 2 as an AC current via inverter circuit 4, and squirrel-cage polyphase induction machine 2 is made to operate as an electric motor; a deceleration mode wherein, when the vehicle is being braked, squirrel-cage polyphase induction machine 2 is made to operate as an electric generator, and the output AC current of squirrel-cage polyphase induction machine 2 is supplied to electrostatic capacitive circuit 20 as a charging current via inverter circuit 4; an acceleration mode wherein, when the vehicle is being accelerated, squirrel-cage polyphase induction machine 2 is made to operate as an electric motor, and energy stored in electrostatic capacitive circuit 20 is supplied via inverter circuit 4 to squirrel-cage polyphase induction machine 2 as an AC current; a warm-up mode wherein, when the internal combustion engine is warming up, squirrel-cage polyphase induction machine 2 is made to operate as an electric generator, and the output AC current of squirrel-cage polyphase induction machine 2 is supplied via inverter circuit 4 to electrostatic capacitive circuit 20 as a charging current; and a supplementary charging mode wherein, when internal combustion engine 1 is operating and the terminal voltage of electrostatic capacitive circuit 20 has fallen to or below a prescribed value, squirrel-cage polyphase induction machine 2 is made to operate as an electric generator, and the output AC current of squirrel-cage polyphase induction machine 2 is supplied via inverter circuit 4 to electrostatic capacitive circuit 20 as a charging current. The terminal voltage of storage battery 22 is set at the rated voltage of standard electrical equipment for motor vehicles. Electrostatic capacitive circuit 20 is identical to the one that was explained above with regard to the first embodiment.

An explanation will now be given of the operation of the second embodiment of this invention thus constituted. Its ordinary operations will be passed over, since these are identical to those of the aforementioned first embodiment, and an explanation will be given of how the charging of electrostatic capacitive circuit 20 is controlled.

Control signals for giving a rotating magnetic field to the stator of squirrel-cage polyphase induction machine 2, the rotating magnetic field corresponding to the rotation of the rotor of the induction machine, are supplied to inverter circuit 4 from inverter control circuit 5. Rotation information from rotation sensor 6 and information relating to the state of charging of electrostatic capacitive circuit 20 are input to this inverter control circuit 5. Inverter control circuit 5 contains a microprocessor and a means whereby operating control signals (which will change according to the driving situation) are introduced as a result of control action by the driver.

As well as being able to give the energy of the DC-side terminals to the AC-side terminals as described above, inverter circuit 4 can give energy generated at the AC-side terminals to the DC-side terminals. Moreover, by using inverter control circuit 5 to control the rotational speed of the rotating magnetic field so that squirrel-cage polyphase induction machine 2 becomes an electric motor, a driving force can be given to the rotary shaft of squirrel-cage polyphase induction machine 2, thereby making said induction machine operate as an auxiliary driving means for internal combustion engine 1. Electrical energy charged in electrostatic capacitive circuit 20 is used under these circumstances.

As long as internal combustion engine 1 is rotating, charging of electrostatic capacitive circuit 20 by the electric generator coupled to internal combustion engine 1 is continued. If the stored energy resulting from charging is used due to operation of a starter motor or auxiliary equipment, the charging of electrostatic capacitive circuit 20 is controlled so that it reaches a fully charged state equivalent to its rated charged capacity in as short a time as possible.

An explanation will now be given of how the charging and discharging of electrostatic capacitive circuit 20 is controlled in embodiments of this invention.

Figure 5:
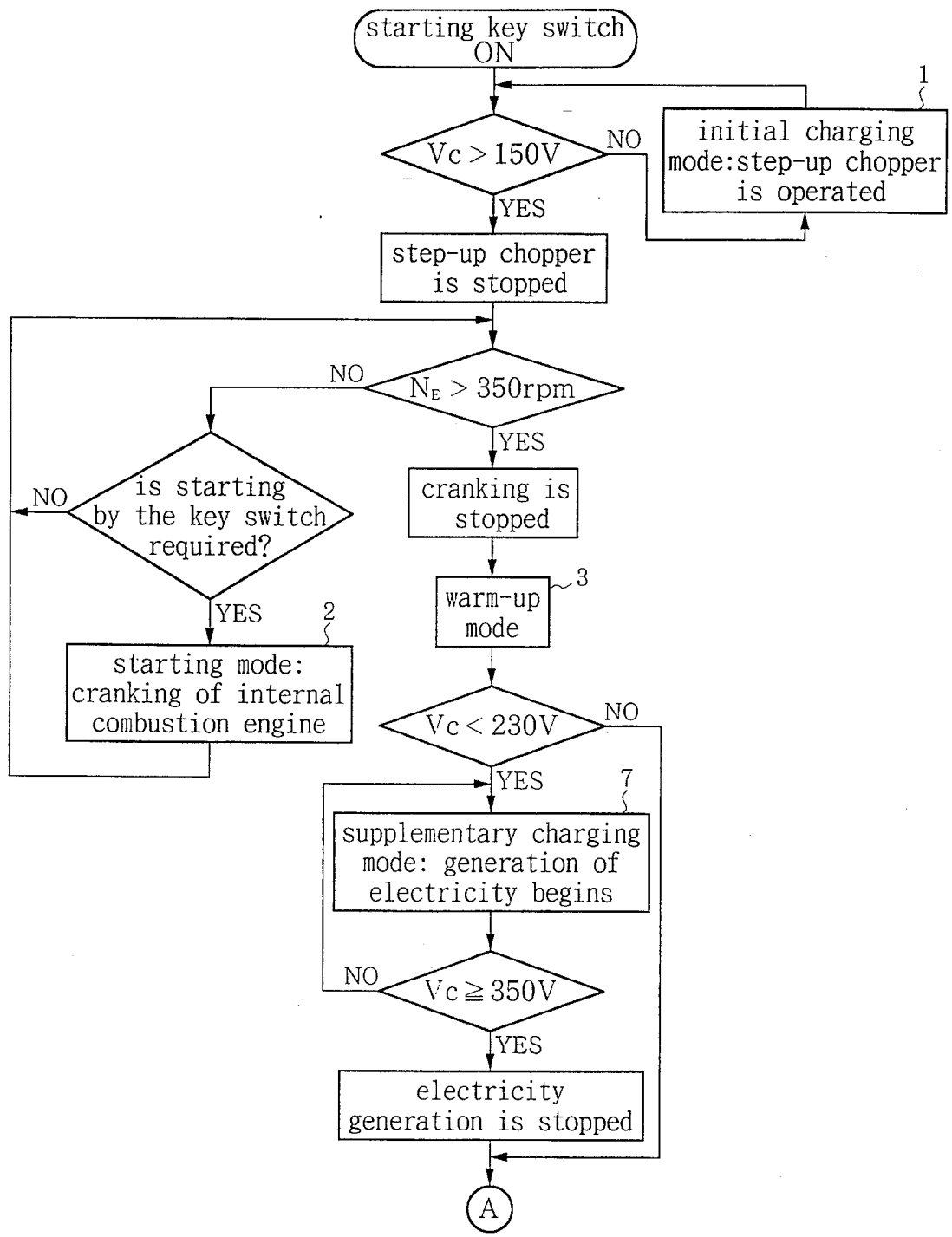
FIG. 5 and FIG. 6 are flowcharts showing the flow of control actions of the inverter control circuit in the second and third embodiments of this invention.
Figure 6:
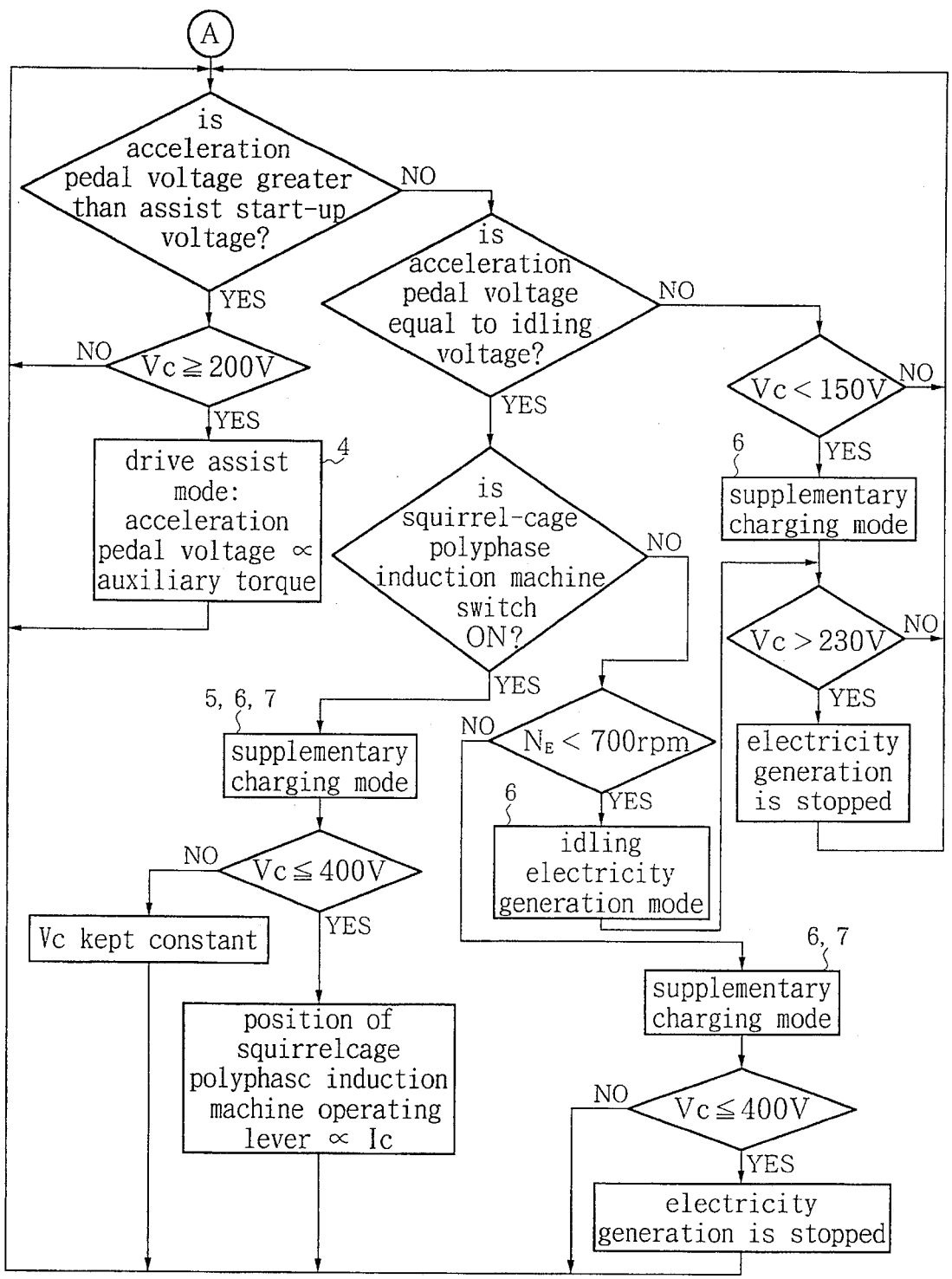
Figure 7:
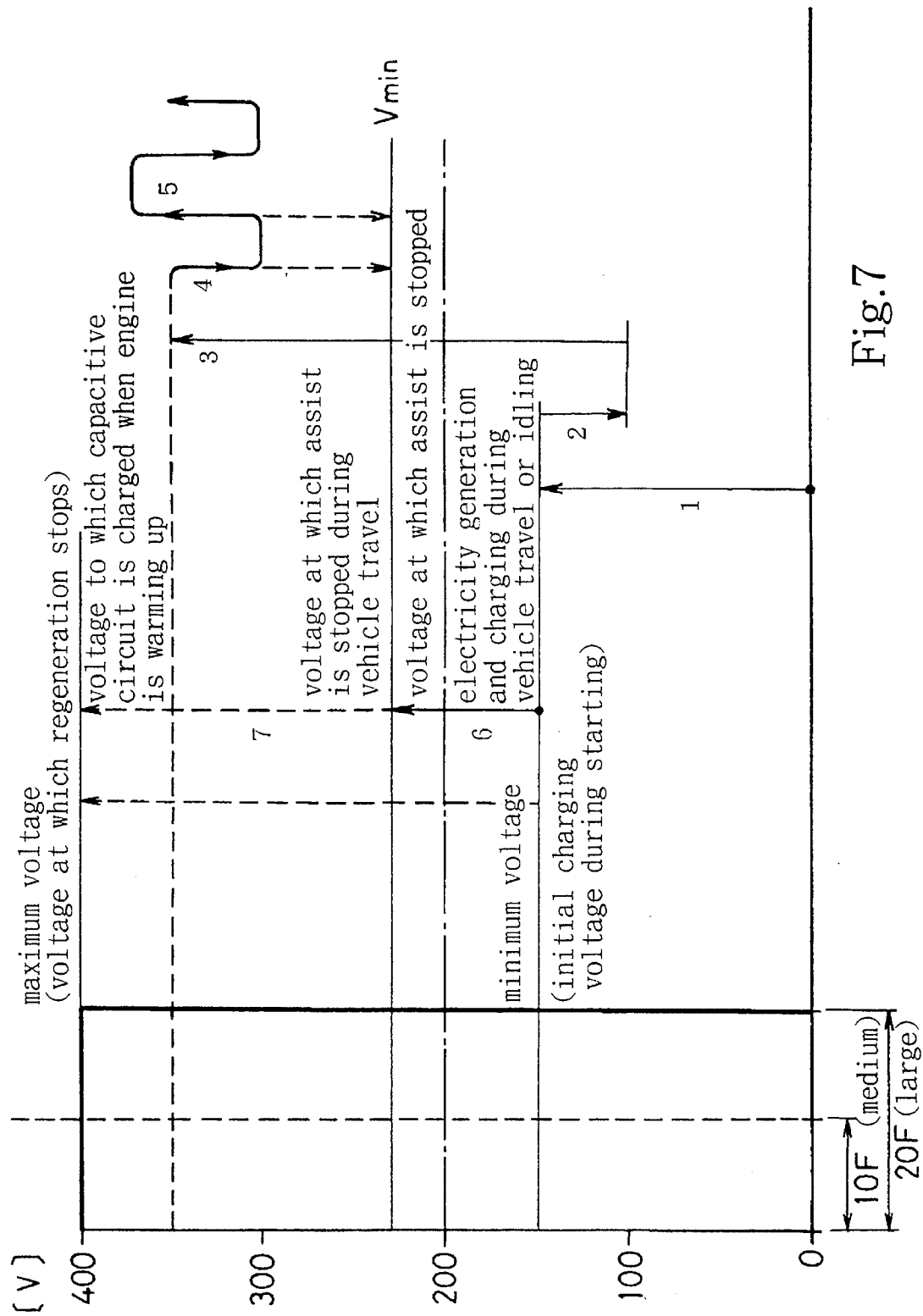
FIG. 7 shows the flow for control of charging and discharging of the electrostatic capacitive circuit in the second and third embodiments of this invention.

FIG. 5 and FIG. 6 explain the operating modes of this second embodiment. FIG. 7 shows the flow for control of charging and discharging of the electrostatic capacitive circuit in the second embodiment.

When there is hardly any stored electric charge in electrostatic capacitive circuit 20, which is the case directly after manufacture of the device or when the device has not been in use for a long time, initial charging mode is selected and the electrostatic capacitive circuit is charged by the step-up chopper in step-up/step-down converter 21 to a minimum voltage of 15.0 V. (See ① in FIG. 7. Identical control steps in FIG. 5 and FIG. 6 are assigned the same numbers.) If starting mode is selected and internal combustion engine 1 is started by means of this voltage, the voltage drops to approximately 100 V (②).

When internal combustion engine 1 starts and begins to warm up, a warm-up mode is selected, squirrel-cage polyphase induction machine 2 begins to generate electricity, electric charge is stored in electrostatic capacitive circuit 20, and the rated voltage of 350 V is reached (③). The motor vehicle is now able to go. When acceleration mode is selected while travelling, electric charge stored in electrostatic capacitive circuit 20 is discharged and squirrel-cage polyphase induction machine 2 is used for auxiliary motive power (④). Alternatively, when deceleration mode is selected while travelling, squirrel-cage polyphase induction machine 2 is used for supplementary charging (⑤).

If acceleration mode is used for a long period of time, the voltage drops, and when it falls below a lower limit voltage which has been set at approximately 230 V, selection of acceleration mode is prohibited. If it reaches the minimum voltage, the control mode changes over to supplementary charging mode, squirrel-cage polyphase induction machine 2 is made to operate as an electric generator, and electrostatic capacitive circuit 20 is slowly charged (⑥). Thus, as long as internal combustion engine 1 is rotating, the quantity of charge stored in electrostatic capacitive circuit 20 is always maintained at or above a prescribed value. Thereafter, the same control is repeated.

Control of the charging and discharging of electrostatic capacitive circuit 20 will now be explained following the steps set out in FIG. 5 and FIG. 6. When the starting key switch is set to ON, it is decided whether or not capacitor voltage $V_c$ of electrostatic capacitive circuit 20 is greater than 150 V. If it is at or below 150 V, initial charging mode ① is selected, the step-up chopper is operated and charging carried out. If it is above 150 V, operation of the step-up chopper is stopped and it is decided whether or not the rotational speed $N_E$ of internal combustion engine 1 exceeds 350 rpm.

If it does not exceed 350 rpm, it is decided whether the starting key switch is ON or OFF, and if internal combustion engine 1 has been started, processing returns again to the decision as to whether or not its rotational speed $N_E$ exceeds 350 rpm. If internal combustion engine 1 has not been started, the starting key switch is closed, cranking carried out, and processing returns to the decision as to whether or not the rotational speed $N_E$ of internal combustion engine 1 exceeds 350 rpm.

If the rotational speed $N_E$ of internal combustion engine 1 does exceed 350 rpm at this processing step, the cranking action which was applied as a result of the starting key switch being closed is stopped and, since the engine is now warming up, warm-up charging mode ③ is selected. Next, it is decided whether or not capacitor voltage $V_c$ of electrostatic capacitive circuit 20 exceeds 230 V. If it is less than 230 V, supplementary charging mode ⑦ is selected, squirrel-cage polyphase induction machine 2 is made to operate as an electric generator, and it is decided whether or not the capacitor voltage $V_c$ exceeds 350 V. If it does not exceed this value, the control flow returns to generation of electricity in supplementary charging mode ⑦, and these processing steps are repeated until 350 V is reached. If 350 V is exceeded, the generation of electricity by squirrel-cage polyphase induction machine 2 is stopped.

Continuing on from this, it is decided whether or not the accelerator pedal voltage (a voltage indicating the displacement of the accelerator pedal) is greater than the assist start-up voltage. If it is greater than the assist start-up voltage, it is decided again whether or not the voltage $V_c$ exceeds 200 V. If it does not exceed 200 V, the control flow returns to the decision as to whether or not the accelerator pedal voltage is greater than the assist start-up voltage. If it does exceed 200 V, the drive assist mode can be selected. In drive assist mode, energy that has been stored in electrostatic capacitive circuit 20 is given via inverter circuit 4 to squirrel-cage polyphase induction machine 2 as an assist voltage, thereby providing supplementary torque for the drive assist. Thereafter, the same control is repeated.

If the accelerator pedal voltage is not greater than the assist start-up voltage, it is decided whether or not this accelerator pedal voltage is an idling voltage (a voltage indicating that the accelerator pedal is not being pressed). If it is not an idling voltage, it is decided whether or not the voltage $V_c$ is less than 150 V.

If $V_c$ is above 150 V, the control flow returns to the decision as to whether or not the accelerator pedal voltage is greater than the assist start-up voltage. If $V_c$ is less than 150 V, supplementary charging mode is selected and it is decided whether or not the capacitor voltage $V_c$ exceeds 230 V. If it does not exceed 230 V, the control flow returns to the decision as to whether or not the accelerator pedal voltage is greater than the assist start-up voltage. If $V_c$ does exceed 230 V, generation of electricity by squirrel-cage polyphase induction machine 2 is stopped.

If it has been decided that the accelerator pedal voltage is an idling voltage, it is decided whether or not the switch of squirrel-cage polyphase induction machine 2 is ON. If it is ON, supplementary charging mode is selected and it is decided whether or not capacitor voltage $V_c$ exceeds 400 V, which is the regeneration shutdown voltage. If it does, capacitor voltage $V_c$ is controlled so that it does not exceed this voltage, and the aforementioned processing operations are repeated. If $V_c$ does not exceed the regeneration shutdown voltage, the position of the operating lever of squirrel-cage polyphase induction machine 2 is set to a position that satisfies the capacitor current $I_c$. Thereafter, the aforementioned processing operations are repeated.

If the switch of squirrel-cage polyphase induction machine 2 is not ON, it is decided whether or not the rotational speed of internal combustion engine 1 exceeds 700 rpm. If it does exceed this value, supplementary charging is carried out and it is decided whether or not capacitor voltage $V_c$ is below 400 V. If it is below 400 V, generation of electricity is stopped. If $V_c$ exceeds 400 V, the control flow returns to the decision as to whether or not the accelerator pedal voltage is greater than the assist start-up voltage, and thereafter the same processing operations as described above are repeated.

If the rotational speed $N_E$ of internal combustion engine 1 is below 700 rpm, there is a changeover to idling electricity generation mode ⑥, and it is decided whether or not capacitor voltage $V_c$ is greater than 230 V. If it is less than 230 V, the Control flow returns to the beginning. If $V_c$ exceeds 230 V, generation of electricity by squirrel-cage polyphase induction machine 2 is stopped.

Figure 8:
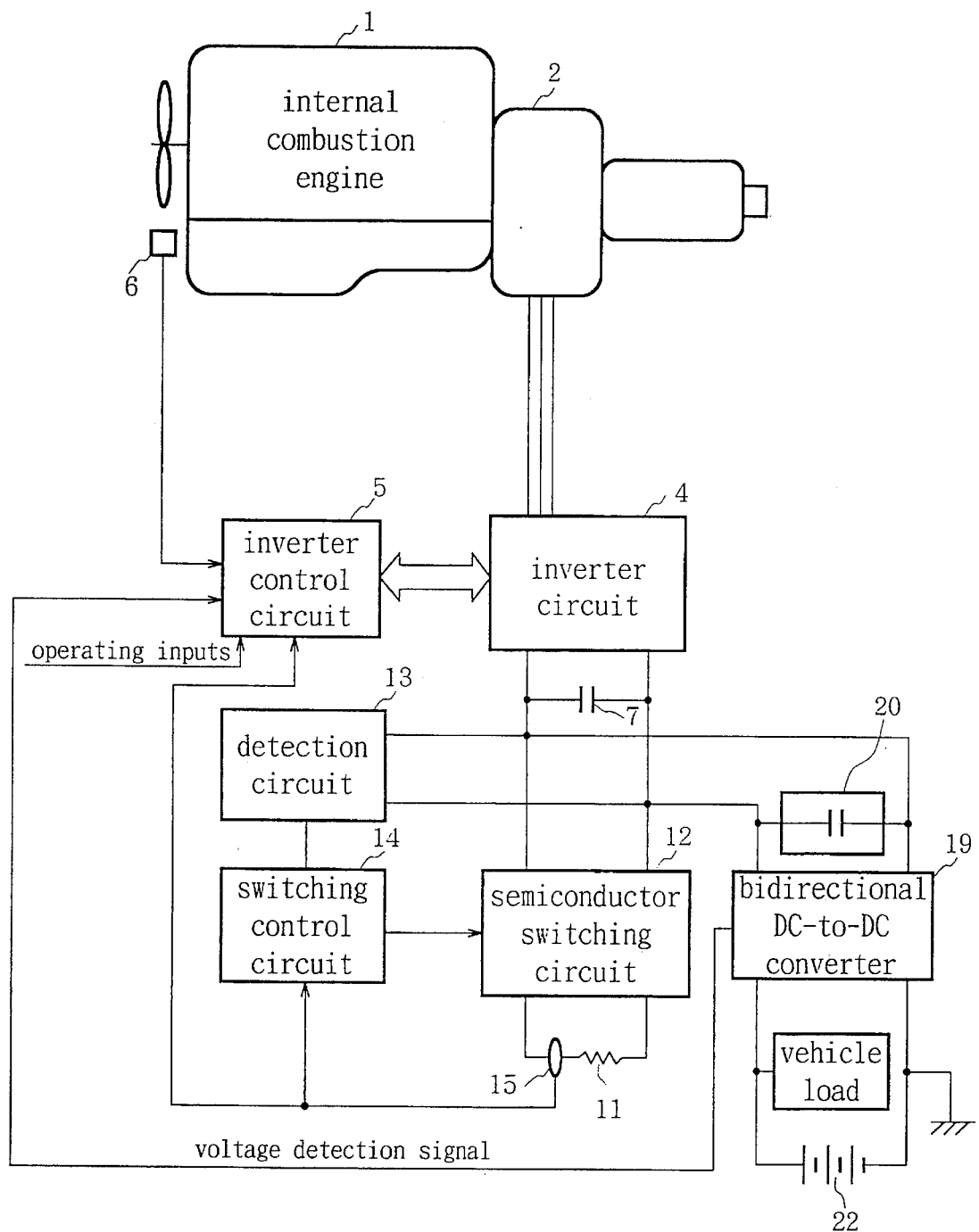
FIG. 8 is a block diagram showing the overall constitution pertaining to a third embodiment of this invention.
Figure 9:
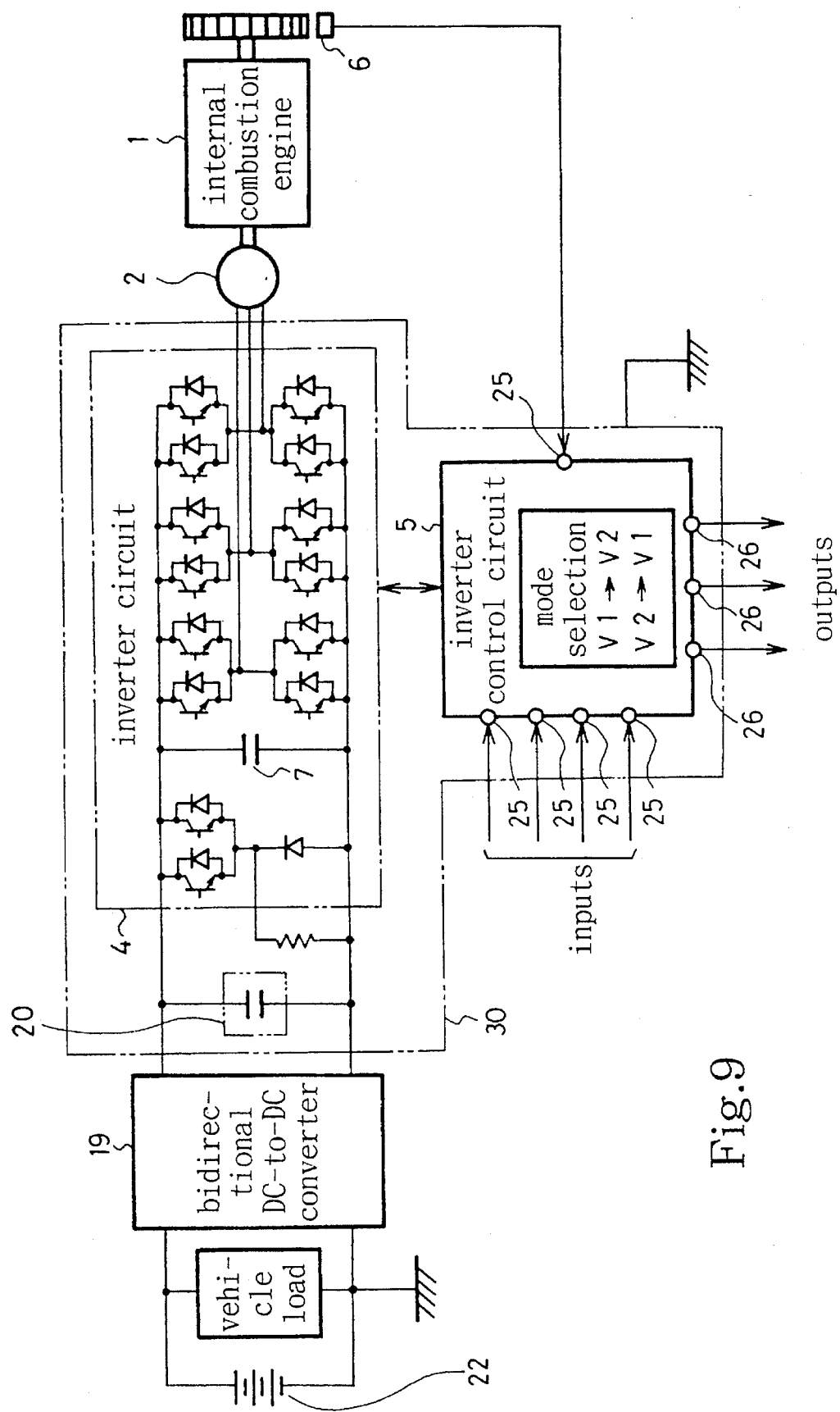
FIG. 9 is a block diagram of an electrical system showing the constitution of the third embodiment of this invention.
Figure 10:
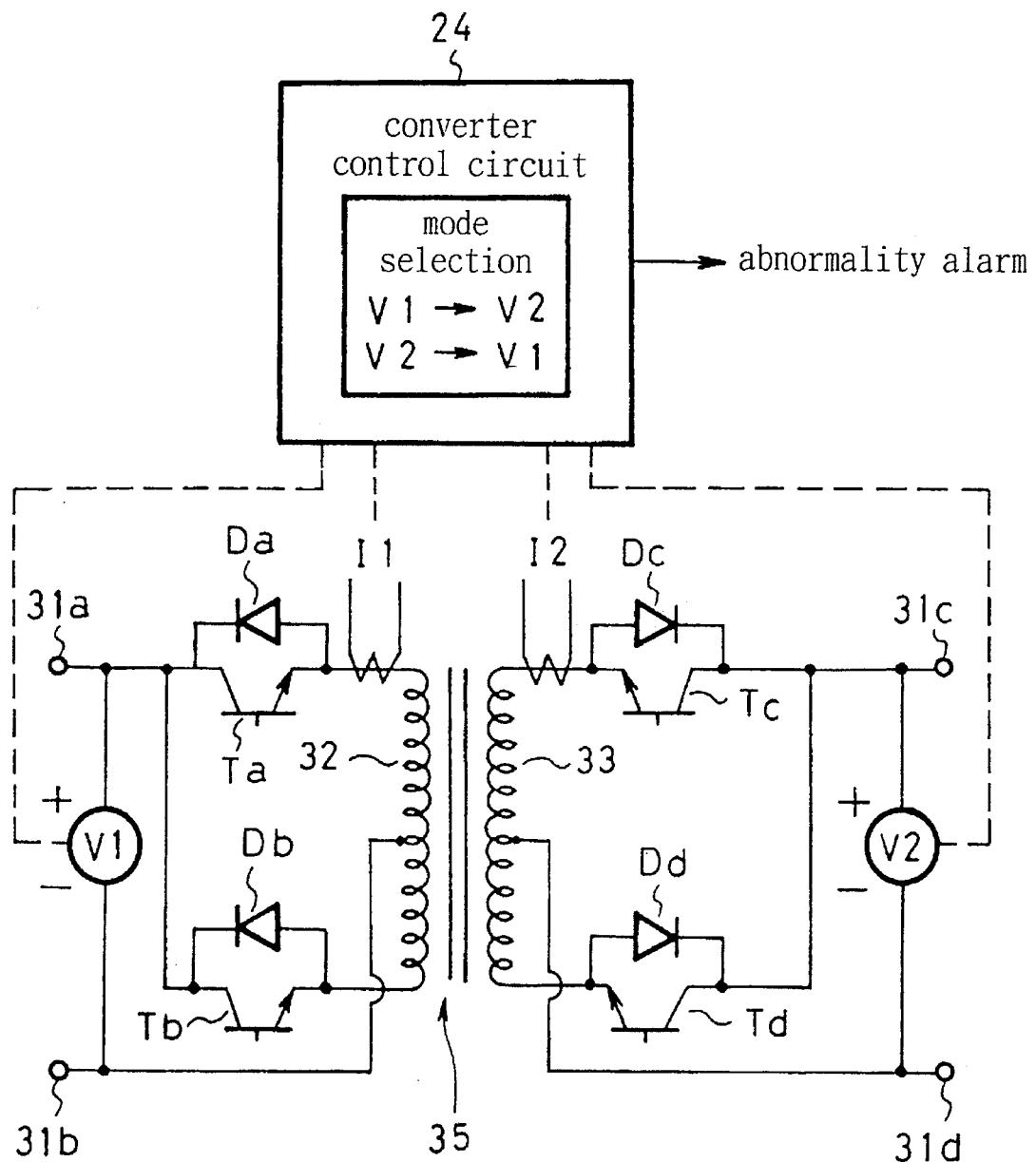
FIG. 10 is a circuit diagram showing the constitution of the bidirectional DC-to-DC converter in the third embodiment of this invention.
Figure 11:
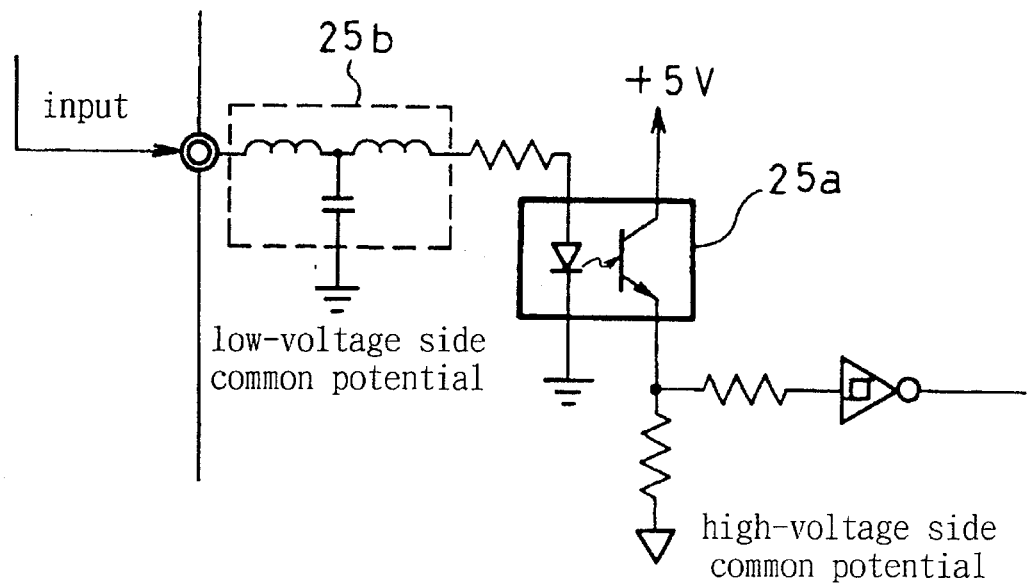
FIG. 11a is a circuit diagram showing the constitution of a common potential separation circuit for control inputs in the third embodiment of this invention.
FIG. 11b is a circuit diagram showing the constitution of a common potential separation circuit for outputs.
Figure 11:
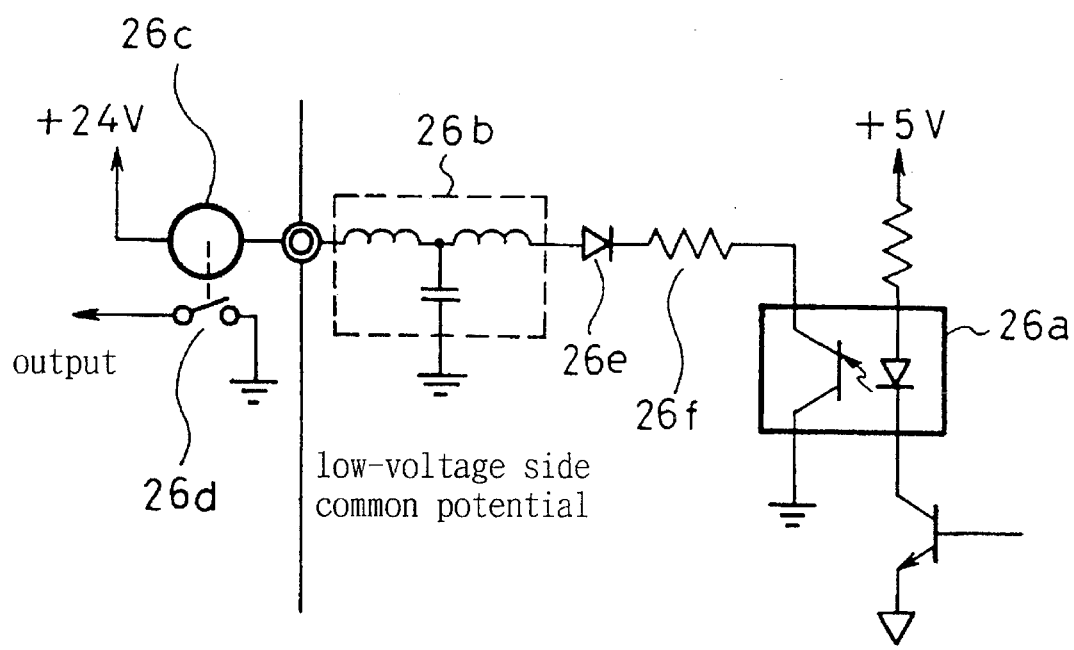
Figure 12:
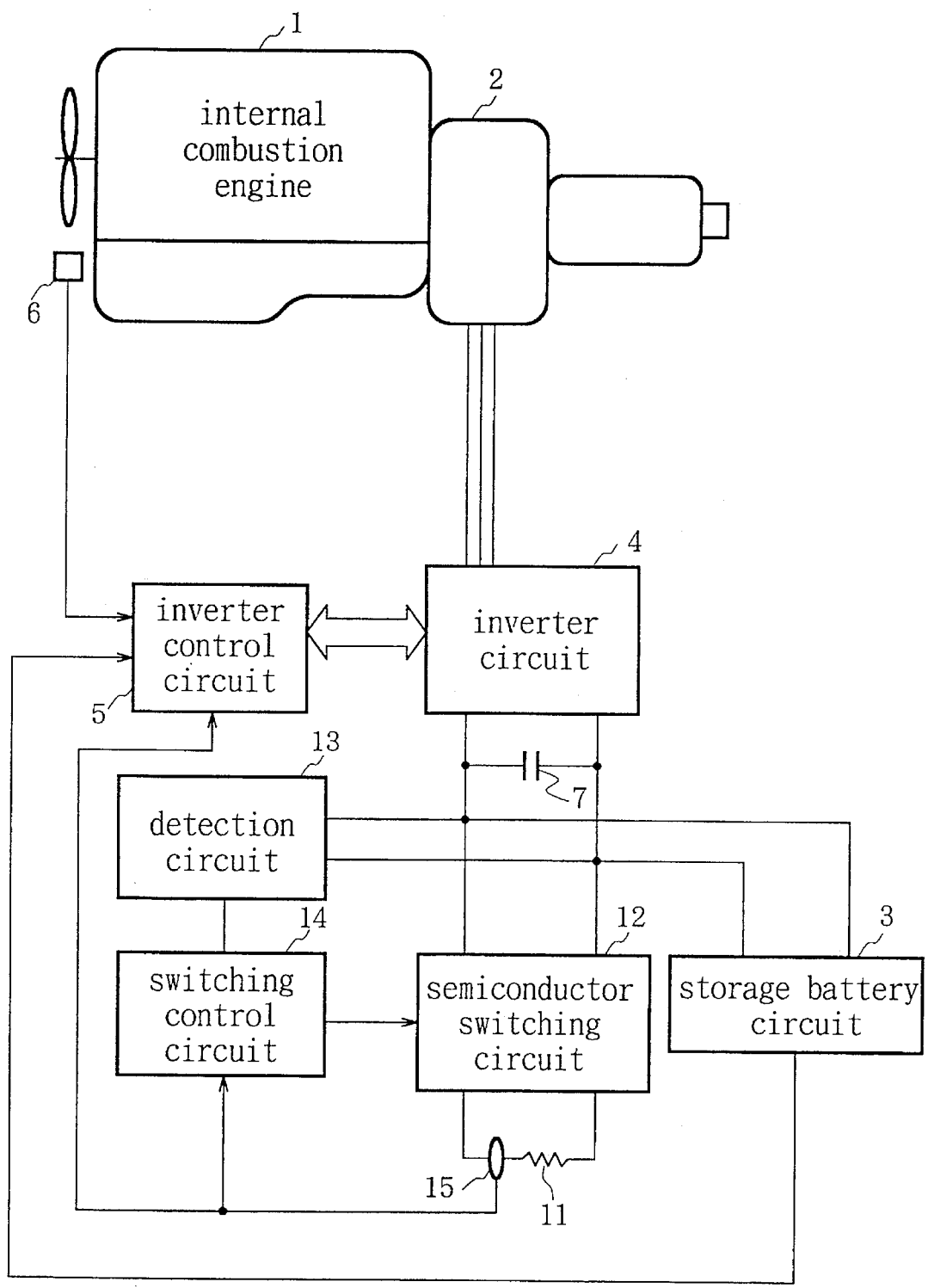
FIG. 12 is a block diagram showing a constitution according to the prior art.

An explanation will now be given of a third embodiment of this invention. FIG. 8 is a block diagram showing the overall constitution of this third embodiment; FIG. 9 is a block diagram of the electrical system showing the constitution of the third embodiment; FIG. 10 is a circuit diagram showing the constitution of the bidirectional DC-to-DC converter in this embodiment of the invention; FIG. 11a is a circuit diagram showing the constitution of a common potential separation circuit for control inputs in this embodiment of the invention; and FIG. 11b is a circuit diagram showing the constitution of a common potential separation circuit for outputs.

As shown in FIG. 8 or FIG. 9, this third embodiment has a storage means which includes high-voltage electrostatic capacitive circuit 20 directly connected to the DC side of inverter circuit 4; storage battery 22 with a low voltage equal to the rated voltage of ordinary electrical equipment for motor vehicles; and bidirectional DC-to-DC converter 19 which is connected between electrostatic capacitive circuit 20 and storage battery 22. Bidirectional DC-to-DC converter 19 includes the converter control circuit 24 shown in FIG. 10, and this controls the direction of energy transfer by controlling the switching of the switching elements in the DC-to-DC converter.

The low-voltage side common potential which constitutes one terminal of storage battery 22 is isolated from the high-voltage side common potential which constitutes one terminal of electrostatic capacitive circuit 20; the common potential of inverter control circuit 5 is connected to the high-voltage side common potential; common potential separation circuits 25 for control inputs are provided at the control input points of inverter control circuit 5, said separation circuits containing photocouplers 25a; common potential separation circuits 26 for outputs are provided at the control output points of inverter control circuit 5, said separation circuits containing photocouplers 26a; and the low-voltage side common potential is connected to the vehicle body potential.

The control modes of converter control circuit 24 include an initial charging mode wherein electrostatic capacitive circuit 20 is Charged with energy of storage battery 22 after conversion by bidirectional DC-to-DC converter 19; and a battery-charging mode wherein, when the terminal voltage of electrostatic capacitive circuit 20 exceeds a prescribed value, storage battery 22 is charged with stored electrical energy from this electrostatic capacitive circuit 20 after conversion by bidirectional DC-to-DC converter 19. The control modes of inverter control circuit 5 include a starting mode wherein energy stored in electrostatic capacitive circuit 20 is given to squirrel-cage polyphase induction machine 2 as an AC current via inverter circuit 4, and squirrel-cage polyphase induction machine 2 is made to operate as an electric motor; a deceleration mode wherein, when the vehicle is being braked, squirrel-cage polyphase induction machine 2 is made to operate as an electric generator, and the output AC current of squirrel-cage polyphase induction machine 2 is supplied via inverter circuit 4 to electrostatic capacitive circuit 20 as a charging current; an-acceleration mode wherein; when the vehicle is being accelerated, squirrel-cage polyphase induction machine 2 is made to operate as an electric motor, and energy stored in electrostatic capacitive circuit 20 is supplied via inverter circuit 4 to squirrel-cage polyphase induction machine 2 as an AC current; a warm-up mode, wherein, following on from the starting mode and while internal combustion engine 1 is warming up, squirrel-cage polyphase induction machine 2 is made to operate as an electric generator, and the output AC current of squirrel-cage polyphase induction machine 2 is supplied via inverter circuit 4 to electrostatic capacitive circuit 20 as a charging current; and a supplementary charging mode wherein, when internal combustion engine 1 is operating and the terminal voltage of electrostatic capacitive circuit 20 has fallen to or below a prescribed value, squirrel-cage polyphase induction machine 2 is made to operate as an electric generator, and the output AC current of squirrel-cage polyphase induction machine 2 is supplied via inverter circuit 4 to electrostatic capacitive circuit 20 as a charging current. Inverter circuit 4, inverter control circuit 5 and electrostatic capacitive circuit 20 are encased in an electrically insulating material and housed in metal container 30 connected to the vehicle body potential.

As shown in FIG. 10, which depicts one example, bidirectional DC-to-DC converter 19 has low-voltage side terminals 31a and 31b; high-voltage side terminals 31c and 31d; transformer 35 comprising low-voltage windings 32 and high-voltage windings 33; low-voltage side switching elements Ta and Tb inserted between low-voltage windings 32 and low-voltage terminals 31a and 31b respectively; high-voltage side switching elements Tc and Td inserted between high-voltage windings 33 and high-voltage side terminals 31c and 31d respectively; low-voltage side rectifying elements Da and Db connected in parallel across low-voltage side switching elements Ta and Tb, respectively; high-voltage side rectifying elements Dc and Dd connected in parallel across high-voltage side switching elements Tc and Td, respectively; and converter control circuit 24 which controls low-voltage side switching elements Ta and Tb and high-voltage side switching elements Tc and Td. Converter control circuit 24 has a control means whereby, in low-voltage-to,high-voltage conversion mode, switching control signals are given to low-voltage side switching elements Ta and Tb, and high-voltage side switching elements Tc and Td are kept open; and a control means whereby, in high-voltage-to-low-voltage conversion mode, switching control signals are given to high-voltage side switching elements Tc and Td, and low-voltage side switching elements Ta and Tb are kept open; and a selection means that selects one or other of the two control modes.

There are also provided low-voltage side detection circuit V1 which detects the terminal voltage across low-voltage side terminals 31a and 31b, and high-voltage side voltage detection circuit V2 which detects the terminal voltage across high-voltage side terminals 31c and 31d. Converter control circuit 24 also includes a means whereby the aforementioned selection means is automatically controlled by fetching the respective detection outputs of these two voltage detection circuits V1 and V2 during starting, and comparing these two detection outputs with respective reference values. There are also provided low-voltage side current detection circuit I1 which detects the current in low-voltage windings 32 and high-voltage side current detection circuit I2 which detects the current in high-voltage windings 33. Converter control circuit 24 also has a means whereby the detection outputs of these two current detection circuits I1 and I2 are fetched and an abnormality alarm is output when these two detection outputs are not within the respective permissible ranges for the aforementioned two control modes.

As shown in FIG. 11a, which depicts one example, common potential separation circuit 25 for control input that is provided at the control input points of inverter control circuit 5 serves to input operating signals or signals from the various sensors, and has filter 25b which removes noise superimposed on these signals, and photocoupler 25a which separates the two common potentials.

As shown in FIG. 11b, which depicts one example, common potential separation circuit 26 for output that is provided at the control output points of inverter control circuit 5 has photocoupler 26a which separates the two common potentials; and diode 26e, resistor 26f and filter 26b, which prevent reverse current due to external noise. The output signal is sent to the external circuits via relay 26c which opens and closes switch 26d.

The operation of the third embodiment so constituted need not be explained in full since it is largely identical to that of the second embodiment described above. The distinguishing characteristic of this third embodiment lies in the operation of the bidirectional DC-to-DC converter. Namely, referring to FIG. 10, in low-voltage-to-high-voltage conversion mode, converter control circuit 24 gives switching control signals to low-voltage side switching elements Ta and Tb, and opens high-voltage side switching elements Tc and Td. Under these circumstances, because the voltage applied to low-voltage side rectifying elements Da and Db, which are parallel-connected across low-voltage side switching elements Ta and Tb, is a reverse voltage, said low-voltage side rectifying elements Da and Db do not operate. On the other hand, because the voltage applied to high-voltage side rectifying elements Dc and Dd, which are parallel-connected across high-voltage side switching elements Tc and Td (which are being kept open), is a forward voltage, said high-voltage side rectifying elements Dc and Dd operate as rectifying elements.

In the high-voltage-to-low-voltage conversion mode, converter control circuit 24 gives switching control signals to high-voltage side switching elements Tc and Td, and opens low-voltage side switching elements Ta and Tb. Under these circumstances, because the voltage applied to high-voltage side rectifying elements Dc and Dd, which are parallel-connected across high-voltage side switching elements Tc and Td, is a reverse voltage, these elements do not operate. On the other hand, because the voltage applied to low-voltage side rectifying elements Da and Db, which are parallel-connected across low-voltage side switching elements Ta and Tb, is a forward voltage, said low-voltage side rectifying elements Da and Db operate as rectifying elements.

As has now been described, the storage means includes high-voltage electrostatic capacitive circuit 20 directly connected to the DC side of inverter circuit 4, and storage battery 22 with a low voltage equal to the rated voltage of the ordinary electrical equipment. Accordingly, to prevent any danger to human beings, the low-voltage side common potential that constitutes one terminal of storage battery 22, and the high-voltage side common potential that constitutes one terminal of electrostatic capacitive circuit 20, are separated by means of the bidirectional DC-to-DC converter and by common potential separation circuits 25 for control inputs and common potential separation circuits 26 for outputs which are provided in inverter control circuit 5 and which are shown in FIGS. 11a and 11b. The common potential of inverter control circuit 5 is then connected to the high-voltage side common potential, and the low-voltage side common potential is connected to the body potential of the motor vehicle.

As has now been explained, as well as providing a lightweight electrical power supply for motor vehicles, this invention enables the utilization efficiency of electrical energy to be improved. It therefore, makes it possible to utilize a braking and auxiliary driving means in smaller vehicles.

Moreover, because an electrostatic capacitive circuit is used, no maintenance is required. It follows that the device can be distributed in dispersed fashion around a vehicle and can be sealed in an insulating structure, thereby ensuring human safety. Other effects include the ability to find the quantity of stored charge accurately and in real-time by means of voltage detection.

When used in conjunction with a battery, other effects of this invention include the ability to start the internal combustion engine even when hardly any stored charge is left in the electrostatic capacitive circuit, and to prevent the supply of braking and auxiliary motive power becoming insufficient, which will occur when a large storage battery falls into disuse.

When a bidirectional DC-to-DC converter is utilized, this invention has the following effects: by controlling the bidirectional DC-to-DC converter, the low voltage required for the general load circuits can be generated and charging of the storage battery can be steadily maintained. In addition, by separating the high-voltage side and low-voltage side common potentials and thereby floating the high-voltage side common potential with respect to the vehicle body potential, electric shock due to a person touching the high-voltage side can be prevented.

We claim:

1. Braking and auxiliary drive apparatus for an internal combustion engine in a motor vehicle, comprising:

a squirrel-cage polyphase induction machine having a polyphase AC circuit, for coupling] said squirrel-cage polyphase induction machine being operatively coupled to a rotary shaft of an internal combustion engine;

an inverter circuit operatively coupled to said polyphase AC circuit of said squirrel-cage polyphase induction machine;

an electricity storage means comprising an electrostatic capacitive circuit operatively coupled to said inverter so that said inverter couples said electrostatic capacitive circuit to said polyphase AC circuit by converting electrical energy in both directions therebetween;

a step-up/step-down converter operatively coupled to said electrostatic capacitive circuit;

a rotation sensor that detects a rotational speed of said rotary shaft;

a storage battery operatively coupled to said step-up/step-down converter so that said step-up/step-down converter electrically connects said storage battery to said electrostatic capacitive circuit, said storage battery having a lower terminal voltage than a DC terminal voltage of said inverter circuit; and a control circuit for controlling said inverter circuit, said control circuit operating in the following control modes:

an initial charging mode wherein said electrostatic capacitive circuit is charged with energy from said storage battery through said step-up/step-down converter, if said internal combustion engine is at a standstill;

a starting mode wherein energy stored in said electrostatic capacitive circuit is provided to said squirrel-cage polyphase induction machine as an AC current via said inverter circuit so that said squirrel-cage polyphase induction machine operates as an electric motor, if said internal combustion engine is being started;

a deceleration mode wherein said squirrel-cage polyphase induction machine operates an electric generator by supplying an AC signal having a frequency that is lower than a frequency corresponding to an actual speed detected by said rotational sensor, said AC signal being provided to said electrostatic capacitive circuit via said inverter circuit for charging said electrostatic capacitive circuit, if said vehicle is being braked; and an acceleration mode wherein said squirrel-cage polyphase induction machine operates an electric motor by supplying an AC signal having a higher frequency than a frequency corresponding to an actual speed detected by said rotational sensor, said electrostatic capacitive circuit providing energy to said squirrel-cage polyphase induction machine via said inverter circuit, if said vehicle is being accelerated.

2. Braking and auxiliary drive apparatus for an internal combustion engine in a motor vehicle, comprising:

a squirrel-cage polyphase induction machine having a polyphase AC circuit, for coupling] said squirrel-cage polyphase induction machine being operatively coupled to a rotary shaft of an internal combustion engine;

an inverter circuit operatively coupled to said polyphase AC circuit of said squirrel-cage polyphase induction machine;

an electricity storage means comprising an electrostatic capacitive circuit operatively coupled to said inverter so that said inverter couples said electrostatic capacitive circuit to said polyphase AC circuit by converting electrical energy in both directions therebetween;

a bidirectional DC-to-DC converter operatively connected to said electrostatic capacitive circuit said bidirectional DC-to-DC converter having switching elements and a control circuit for controlling a direction of energy transfer by controlling switching of said switching elements;

a rotation sensor that detects a rotational speed of said rotary shaft;

a storage battery operatively coupled to said DC-to-DC converter so that said DC-to-DC converter electrically connects said storage battery to said electrostatic capacitive circuit, said storage battery having a lower terminal voltage than a DC terminal voltage of said inverter circuit; and a control circuit for controlling said inverter circuit, said control circuit operating in the following control modes:

an initial charging mode wherein said electrostatic capacitive circuit is charged with energy from said storage battery through said DC-to-DC converter, if said internal combustion engine is at a standstill;

a starting mode wherein energy stored in said electrostatic capacitive circuit is provided to said squirrel-cage polyphase induction machine as an AC current via said inverter circuit so that said squirrel-cage polyphase induction machine operates as an electric motor, if said internal combustion engine is being started;

a deceleration mode wherein said squirrel-cage polyphase induction machine operates an electric generator by supplying an AC signal having a frequency that is lower than a frequency corresponding to an actual speed detected by said rotational sensor, said AC signal being provided to said electrostatic capacitive circuit via said inverter circuit for charging said electrostatic capacitive circuit, if said vehicle is being braked; and an acceleration mode wherein said squirrel-cage polyphase induction machine operates an electric motor by supplying an AC signal having a higher frequency than a frequency corresponding to an actual speed detected by said rotational sensor, said electrostatic capacitive circuit providing energy to said squirrel-cage polyphase induction machine via said inverter circuit, if said vehicle is being accelerated.

3. Braking and auxiliary drive apparatus for an internal combustion engine, comprising:

a squirrel-cage polyphase induction machine having a polyphase AC circuit, for coupling] said squirrel-cage polyphase induction machine having a rotary shaft that is directly coupled to a rotary shaft of the internal combustion engine;

an inverter circuit operatively coupled to said polyphase AC circuit of said squirrel-cage polyphase induction machine;

an electricity storage means comprising an electrostatic capacitive circuit operatively coupled to said inverter so that said inverter couples said electrostatic capacitive circuit to said polyphase AC circuit by converting electrical energy in both directions therebetween;

a control circuit that controls said inverter circuit such that in an acceleration mode, said squirrel-cage polyphase induction machine is used as an auxiliary driving means for said internal combustion engine by providing a rotating magnetic field with a velocity that exceeds a rotational speed of said internal combustion engine to said squirrel-cage polyphase induction machine, and in a deceleration mode, said squirrel-cage polyphase induction machine is used as a braking device for said internal combustion engine by providing a rotating magnetic field with a velocity that is less than said rotational speed of said internal combustion engine to said squirrel-cage polyphase induction machine; and wherein said inverter circuit includes a circuit which, in said acceleration mode, outputs electrical energy stored in said electricity storage means to said squirrel-cage polyphase induction machine as a polyphase AC output, and in said deceleration mode, outputs polyphase AC energy from said squirrel-cage polyphase induction machine to said electricity storage means; and a storage battery having a lower terminal voltage than a DC terminal voltage of said inverter circuit;

a bidirectional DC-to-DC converter connecting said storage battery to said electrostatic capacitive circuit, said bidirectional DC-to-DC converter having switching elements and a control circuit for controlling a direction of energy transfer by controlling switching of said switching elements.

4. A braking and auxiliary driving means for a motor vehicle as set forth in claim 1, 2 or 3, and wherein a terminal voltage of said storage battery corresponds to a rated voltage of standard electric equipment of said motor vehicle.

5. A braking and auxiliary driving means for an internal combustion engine as set forth in claim 2 or 3, and wherein:

a low-voltage side common potential constituting one terminal of said control circuit includes an initial charging mode, wherein said electrostatic capacitive circuit is charged with energy from said storage battery after conversion by said DC-to-DC converter; and a battery-charging mode wherein, if a terminal voltage of said electrostatic capacitive circuit exceeds a prescribed value, said storage battery is charged with stored electrical energy from said electrostatic capacitive circuit after conversion by said DC-to-DC converter.

6. A braking and auxiliary driving means for an internal combustion engine as set forth in claim 5, wherein said low-voltage side common potential is connected to a potential of said internal combustion engine.

7. A braking and auxiliary driving means for an internal combustion engine as set forth in claim 6, wherein said control modes of said control circuit include an initial charging mode wherein said electrostatic capacitive circuit is charged with energy from said storage battery after conversion by said DC-to-DC converter; and a battery-charging mode wherein, if a terminal voltage of said electrostatic capacitive circuit exceeds a prescribed value, said storage battery is charged with stored electrical energy from said electrostatic capacitive circuit after conversion by said DC-to-DC converter.

8. A braking and auxiliary driving means for an internal combustion engine as set forth in claim 6, further comprising an electrically insulating material encasing said inverter circuit, control circuit and electrostatic capacitive circuit and a metal container connected to said vehicle body potential having said inverter circuit, control circuit and electrostatic capacitive circuit housed therein.

9. In respect of a braking and auxiliary driving means for an internal combustion engine as set forth in claim 1:

a braking and auxiliary driving means for a motor vehicle characterised in that the control modes of the aforementioned control circuit include:

an initial charging mode wherein, with the aforementioned internal combustion engine at standstill, the aforementioned electrostatic capacitive circuit is charged with the energy of the aforementioned storage battery after the voltage has been stepped up by a step-up/step-down converter;

a starting mode wherein, when the aforementioned internal combustion engine is being started, energy stored in the aforementioned electrostatic capacitive circuit is given to the aforementioned squirrel-cage polyphase induction machine as an AC current via the aforementioned inverter circuit, and the aforementioned squirrel-cage polyphase induction machine is made to operate as an electric motor;

a deceleration mode wherein, when the aforementioned motor vehicle is being braked, the aforementioned squirrel-cage polyphase induction machine is made to operate as an electric generator, and the output AC current of the aforementioned squirrel-cage polyphase induction machine is supplied to the aforementioned electrostatic capacitive circuit as a charging current via the aforementioned inverter circuit; and an acceleration mode, wherein, when the aforementioned motor vehicle is being accelerated, the aforementioned squirrel-cage polyphase induction machine is made to operate as an electric motor, and energy stored in the aforementioned electrostatic capacitive circuit is supplied via the aforementioned inverter circuit to the aforementioned squirrel-cage polyphase induction machine as an AC current.

10. Braking and auxiliary drive apparatus for an internal combustion engine, comprising:

a squirrel-cage polyphase induction machine having a polyphase AC circuit, for coupling] said squirrel-cage polyphase induction machine having a rotary shaft that is directly coupled to a rotary shaft of the internal combustion engine;

an inverter circuit operatively coupled to said polyphase AC circuit of said squirrel-cage polyphase induction machine;

an electricity storage means comprising an electrostatic capacitive circuit operatively coupled to said inverter so that said inverter couples said electrostatic capacitive circuit to said polyphase AC circuit by converting electrical energy in both directions therebetween;

including said internal combustion engine and wherein:

said rotary shaft of the aforementioned internal combustion engine and a rotary shaft of the aforementioned squirrel-cage polyphase induction machine are directly connected;]

a control circuit that controls said inverter circuit such that in an acceleration mode, said squirrel-cage polyphase induction machine is used as an auxiliary driving means for said internal combustion engine by providing a rotating magnetic field with a velocity that exceeds a rotational speed of said internal combustion engine to said squirrel-cage polyphase induction machine, and in a deceleration mode, said squirrel-cage polyphase induction machine is used as a braking device for said internal combustion engine by providing a rotating magnetic field with a velocity that is less than said rotational speed of said internal combustion engine to said squirrel-cage polyphase induction machine; and wherein said inverter circuit includes a circuit which, in said acceleration mode, outputs electrical energy stored in said electricity storage means to said squirrel-cage polyphase induction machine as a polyphase AC output, and in said deceleration mode, outputs polyphase AC energy from said squirrel-cage polyphase induction machine to said electricity storage means.

11. A braking and auxiliary driving means for a motor vehicle as set forth in claim 1 or 10, and wherein:

said control modes of said control circuit also include:

a warm-up mode wherein, if internal combustion engine is warming up, said squirrel-cage polyphase induction machine operates as an electric generator and an output AC current of said squirrel-cage polyphase induction machine is supplied via said inverter circuit to said electrostatic capacitive circuit as a charging current; and a supplementary charging mode wherein, if said internal combustion engine is operating and a terminal voltage of said electrostatic capacitive circuit no greater than a prescribed value, said squirrel-cage polyphase induction machine operates as an electric generator, and said output AC current of said squirrel-cage polyphase induction machine is supplied via said inverter circuit to said electrostatic capacitive circuit as a charging current.

* * * * *